(12) United States Patent
Kanemoto et al.

(10) Patent No.: US 12,164,552 B2
(45) Date of Patent: Dec. 10, 2024

(54) CLASSIFICATION OF SENTENCES FROM CLUSTERS OF INTEREST

(71) Applicant: SONY GROUP CORPORATION, Tokyo (JP)

(72) Inventors: Katsuyoshi Kanemoto, Tokyo (JP); Michael Siegfried Spranger, Tokyo (JP); Akihito Kumakura, Tokyo (JP); Kojiro Kashiwa, Tokyo (JP); Ippei Murofushi, Tokyo (JP); Jin Nakayama, Tokyo (JP); Ryota Ando, Tokyo (JP); Koichiro Shimoda, Tokyo (JP); Yoshinori Akisawa, Tokyo (JP); Nobuo Sato, Tokyo (JP); Masaaki Nagata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/904,014

(22) PCT Filed: Feb. 5, 2021

(86) PCT No.: PCT/JP2021/004357
§ 371 (c)(1),
(2) Date: Aug. 11, 2022

(87) PCT Pub. No.: WO2021/166692
PCT Pub. Date: Aug. 26, 2021

(65) Prior Publication Data
US 2023/0108518 A1  Apr. 6, 2023

(30) Foreign Application Priority Data
Feb. 21, 2020  (JP) .................. 2020-028093

(51) Int. Cl.
*G06F 16/35* (2019.01)
*G06F 16/338* (2019.01)

(52) U.S. Cl.
CPC ............ *G06F 16/35* (2019.01); *G06F 16/338* (2019.01)

(58) Field of Classification Search
None
See application file for complete search history.

(56) References Cited

U.S. PATENT DOCUMENTS

| | | | | |
|---|---|---|---|---|
| 2006/0206483 | A1* | 9/2006 | Knepper | G06F 16/313 707/E17.084 |
| 2012/0246162 | A1* | 9/2012 | Yamaguchi | G06F 7/00 707/769 |

(Continued)

FOREIGN PATENT DOCUMENTS

| | | |
|---|---|---|
| JP | 2003-044491 A | 2/2003 |
| JP | 2009-294939 A | 12/2009 |

OTHER PUBLICATIONS

International Search Report and Written Opinion of PCT Application No. PCT/JP2021/004357, issued on Apr. 20, 2021, 10 pages of ISRWO.

*Primary Examiner* — Eddy Cheung
(74) *Attorney, Agent, or Firm* — CHIP LAW GROUP

(57) ABSTRACT

Provided are an information processing apparatus and an information processing method capable of supporting work of giving a classification to a group of sentences. The information processing apparatus includes a presentation unit that presents a sentence included in a cluster of interest among clusters generated by clustering a sentence set in a sentence selection region, and a reception unit that receives (Continued)

selection of the sentence constituting a group of sentences from the sentences presented in the sentence selection region.

24 Claims, 26 Drawing Sheets

(56) References Cited

U.S. PATENT DOCUMENTS

2013/0268535 A1* 10/2013 Inaba ................. G06F 3/048
707/740
2016/0042299 A1* 2/2016 Liang ............... G06F 16/24578
706/12

* cited by examiner

FIG. 11

| RESULT OF CLUSTERING | | |
|---|---|---|
| NUMBER | SCORE | REPRESENTATIVE WORD |
| ... | ... | ... |
| 8 | 0.65 | POWER SUPPLY, BATTERY, BATTERY, ... |
| 14 | 0.72 | ACCOUNT, REGISTER, PASSWORD, ... |
| ... | ... | ... |

211

POWER SUPPLY BATTERY BATTERY CHARGE ...

CREATE NEW FAQ FROM SELECTED SENTENCE, OR ADD TO FAQ

212

213 — DETAILS OF SELECTED CLUSTER

- SEARCH KEYWORD GROUP-1: CHARGE   (215-1)
- SEARCH KEYWORD GROUP-2:          (215-2)
- SEARCH KEYWORD GROUP-3:
- SEARCH KEYWORD GROUP-4:

241 — 0 KEYWORDS
POWER SUPPLY
BATTERY
IMPOSSIBLE

242 — BATTERY

| HIGHLIGHT | REPRESENTATIVE WORD | | SELECTION | SENTENCE |
|---|---|---|---|---|
| ☑ | POWER SUPPLY | 10.3 | ☐ | IT IS NOT ABLE TO BE CHARGED EVEN THOUGH POWER SUPPLY IS LINKED ... |
| ☑ | BATTERY | 14.2 | ☐ | BATTERY COULD HAVE BEEN OLD ... |
| ☑ | BATTERY | 13.2 | ☐ | CONNECTING TO CHARGER ... |
| ☑ | CHARGE | 13.0 | ☐ | WHERE IS BATTERY ... |
| ☐ | | | ☐ | ... |
| | | | ☑ | I WANT TO REPLACE BATTERY THOUGH ... |

214 — Mess...

216 — REFLECT    217 — CLEAR

| FAQ LIST | | |
|---|---|---|
| FAQ | NUMBER | |
| NEW / REGARDING CHARGE | 22 | |
| FAQ-1 / POWER SUPPLY IS NOT ON | 14 | |
| FAQ-2 / SCREEN IS NOT DISPLAYED | 32 | |

261

| SENTENCE |
|---|
| IT IS NOT CHARGED EVEN THOUGH POWER SUPPLY IS LINKED ... |
| BATTERY COULD HAVE BEEN OLD ... |
| CONNECTING TO CHARGER ... |
| WHERE IS BATTERY ... |
| ... |
| ... |
| ... |

| RESULT OF CLUSTERING | | |
|---|---|---|
| NUMBER | SCORE | REPRESENTATIVE WORD |
| ... | ... | ... |
| 5 | 0.65 | CHARGER, POWERSUPPLY, CONNECT, ... |
| 4 | 0.72 | BATTERY, BATTERY, REPLACE, ... |
| ... | ... | ... |

211

CHARGER, POWERSUPPLY, CONNECT, ...

CREATE NEW FAQ FROM SELECTED SENTENCE, OR ADD TO FAQ

212

213 — DETAILS OF SELECTED CLUSTER

SEARCH KEYWORD GROUP-1:
SEARCH KEYWORD GROUP-2:
SEARCH KEYWORD GROUP-3:
SEARCH KEYWORD GROUP-4:

215-1  215-2  215-3  215-4   214   216   217

REFLECT    CLEAR

Mess...

| HIGHLIGHT | REPRESENTATIVE WORD | SCORE |
|---|---|---|
| ☑ | CHARGER | 16.3 |
| ☑ | POWERSUPPLY | 14.2 |
| ☑ | CONNECT | 13.2 |
| ☐ | ... | ... |

| SELECTION | SENTENCE |
|---|---|
| ☐ | IT IS NOT ABLE TO BE CHARGED EVEN THOUGH POWERSUPPLY IS LINKED... |
| ☐ | I TRIED TO CHARGE.... |
| ☐ | CONNECTING TO CHARGER... |
| ☐ | WHERE IS BATTERY... |
| ... | ... |
| ☑ | I WANT TO REPLACE BATTERY, THOUGH.... |

| | CREATION OF NEW FAQ/ADDITION OF SENTENCE TO EXISTING FAQ | | |
|---|---|---|---|
| | SELECTION | SENTENCE | SCORE |
| | ☑ | IT IS NOT ABLE TO BE CHARGED EVEN THOUGH POWER SUPPLY IS LINKED.... | — |
| | ☑ | I TRIED TO CHARGE .... | — |
| | ☑ | CONNECTING TO CHARGER: ..... | 0.9 |
| | ☐ | IS BATTERY FAILED .... | 0.84 |
| | ☐ | I WANT TO BUY LINKING CHARGER .... | ... |
| | ... | ... | ... |

311

ORIGINAL SENTENCE
I CONNECTED IT TO CHARGER AND CHARGED IT.
ALTHOUGH AROUND EVENING YESTERDAY, IT COULDN'T BE CHARGED WELL

312

EDITED SENTENCE
I CONNECTED IT TO CHARGER AND CHARGED IT.
IT COULDN'T BE CHARGED WELL

313

SEARCH SENTENCE CLOSE TO CHECK — 317

314  315-1  315-2  315-3  315-4  316

SEARCH KEYWORD GROUP-1:
SEARCH KEYWORD GROUP-2:
SEARCH KEYWORD GROUP-3:
SEARCH KEYWORD GROUP-4:

REFLECT

| FAQ | SCORE | NUMBER |
|---|---|---|
| CREATION OF NEW FAQ | — | — |
| FAQ-9 / IT IS NOT ABLE TO BE CHARGED | 0.98 | 43 |
| FAQ-3 / I WANT TO BUY BATTERY | 0.88 | 23 |
| ... | ... | ... |
| ... | ... | ... |

Message Set not selected — 318

NAME:

CREATE FAQ AND ADD — 319

☐ CORRESPONDING MEMO

Kd-40f1
POWER SUPPLY LED SEVERAL TIMES LIGHTING FROM YESTERDAY

SEVERAL YEARS OR MORE SINCE PURCHASE

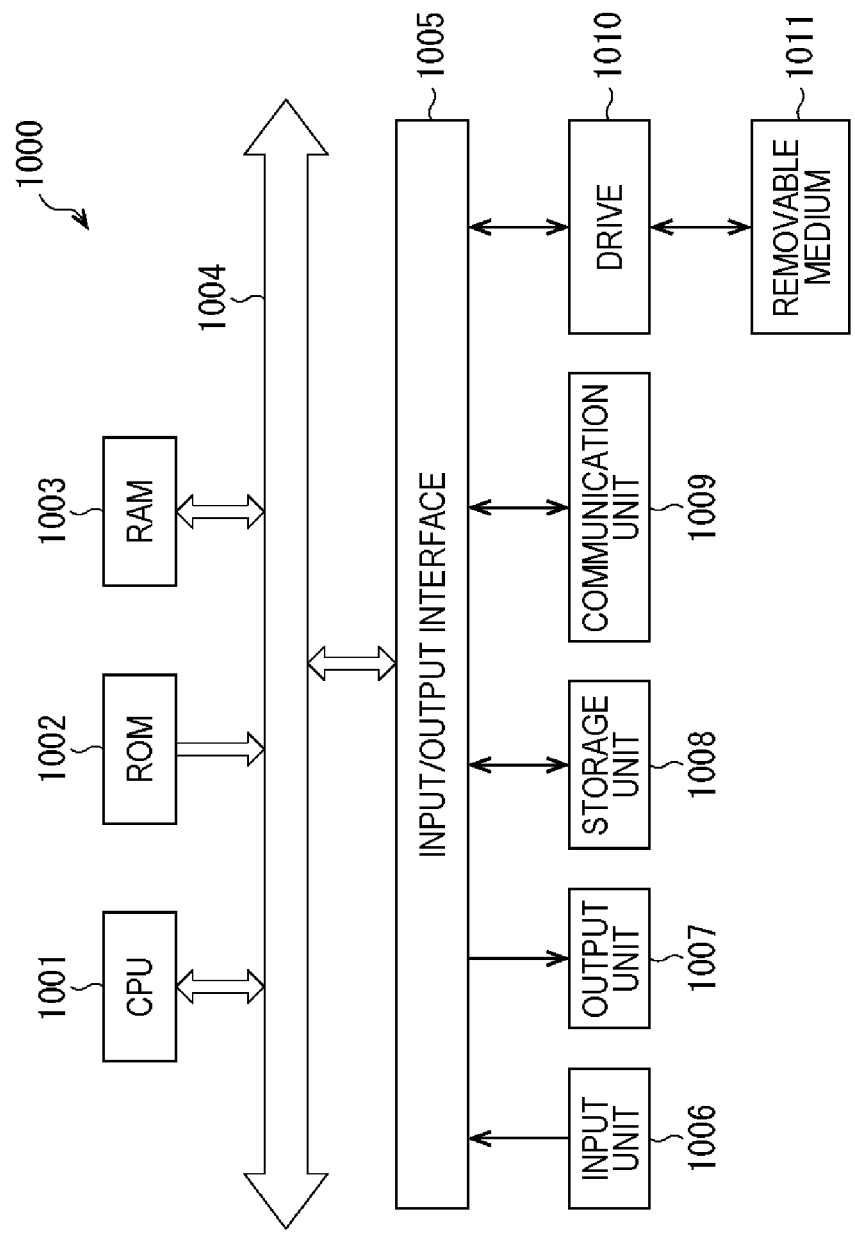

CLASSIFICATION OF SENTENCES FROM CLUSTERS OF INTEREST

CROSS REFERENCE TO RELATED APPLICATIONS

This application is a U.S. National Phase of International Patent Application No. PCT/JP2021/004357 filed on Feb. 5, 2021, which claims priority benefit of Japanese Patent Application No. JP 2020-028093 filed in the Japan Patent Office on Feb. 21, 2020. Each of the above-referenced applications is hereby incorporated herein by reference in its entirety.

TECHNICAL FIELD

The present disclosure relates to an information processing apparatus, an information processing method, and a program, and more particularly, to an information processing apparatus, an information processing method, and a program capable of supporting work of giving a classification to a group of sentences.

BACKGROUND ART

Patent Document 1 discloses a technique of causing a user to set an important word, an unnecessary word, a synonym, or the like that is an axis of a cluster in a knowledge management system, and performing clustering processing of sorting accumulated information into clusters on the basis of the setting. With to this technology, it can be expected to realize the classification as intended by the user without being affected by the content bias of the accumulated information.

In addition, in recent years, with diversification of electronic devices, it is necessary to accurately and quickly search for information corresponding to an inquiry of a user from among enormous information regarding the electronic devices. Examples of the information corresponding to the inquiry of the user include frequently asked questions (FAQ) or the like.

CITATION LIST

Patent Document

Patent Document 1: Japanese Patent Application Laid-Open No. 2003-44491

SUMMARY OF THE INVENTION

Problems to be Solved by the Invention

However, for example, when a group of sentences is created by clustering sentences such as user's inquiries, it is not always possible to create a group of sentences as intended.

The present disclosure has been made in view of such a situation, and an object thereof is to support work of giving a classification to a group of sentences.

Solutions to Problems

An information processing apparatus according to the present disclosure is an information processing apparatus including: a presentation unit configured to present a sentence included in a cluster of interest among clusters generated by clustering a sentence set in a sentence selection region; and a reception unit configured to receive selection of the sentence constituting a group of sentences from the sentences presented in the sentence selection region.

An information processing method of the present disclosure is an information processing method that is executed by an information processing apparatus, including: presenting a sentence included in a cluster of interest among clusters generated by clustering a sentence set in a sentence selection region; and receiving selection of the sentence constituting a group of sentences from the sentences presented in the sentence selection region.

A program of the present disclosure is a program for causing a computer to execute: presenting a sentence included in a cluster of interest among clusters generated by clustering a sentence set in a sentence selection region; and receiving selection of the sentence constituting a group of sentences from the sentences presented in the sentence selection region.

In the present disclosure, the sentence included in a cluster of interest among clusters generated by clustering a sentence set is presented in a sentence selection region, and selection of the sentence constituting a group of sentences from the sentences presented in the sentence selection region is received.

BRIEF DESCRIPTION OF DRAWINGS

FIG. 11 is a diagram illustrating an example of a GUI.
FIG. 14 is a diagram illustrating an example of a GUI.
FIG. 15 is a diagram illustrating an example of a GUI.
FIG. 16 is a diagram illustrating an example of a GUI.
FIG. 18 is a diagram illustrating an example of a GUI.
FIG. 24 is a diagram illustrating an example of a GUI.
FIG. 26 is a block diagram illustrating a hardware configuration example of a computer.

MODE FOR CARRYING OUT THE INVENTION

Hereinafter, modes for carrying out the present disclosure (hereinafter, referred to as embodiments) will be described. Note that the description will be given in the following order.

1. Summary of problems of prior art and technology according to the present disclosure
2. Configuration of information processing system
3. Presentation of information for creating a group of sentences
4. Presentation of information for giving classification to a group of sentences
5. Applications
6. Configuration example of computer <1. Problems of Prior Art and Outline of Technology According to the Present Disclosure>
(Problems of Prior Art)

Conventionally, in a search related to a question response in a call center or the like, it is important to efficiently reuse past answers. In a call center or the like, frequently performed questions and answers thereof are prepared in advance as FAQs, whereby it is possible to omit the question response work by the operator and to reduce the operation cost.

Therefore, it is necessary to manually summarize FAQs or select frequently appearing FAQs on the basis of responses to e-mails and telephones sent to a call center.

In recent years, as a method of automating FAQ creation, a method of calculating similarity between sentences (inquiries) using a scale called cosine measure and clustering sentences having high similarity is used.

Moreover, in recent years, Q/As having the same intention are collected from a history of past questions/answers (Q/As) and classified into existing FAQs, or those that cannot be classified into existing FAQs are created as new FAQs.

However, when a group of sentences is created by clustering a plurality of sentences such as questions/answers using natural language processing, the group of sentences cannot necessarily be created as intended by the operator. This is because, for example, there is a gap between the similarity between questions and a unit of clustering based on the similarity, the closeness of intention of the questions, and a unit of a group of questions/answers created as FAQ.

Figure 1:
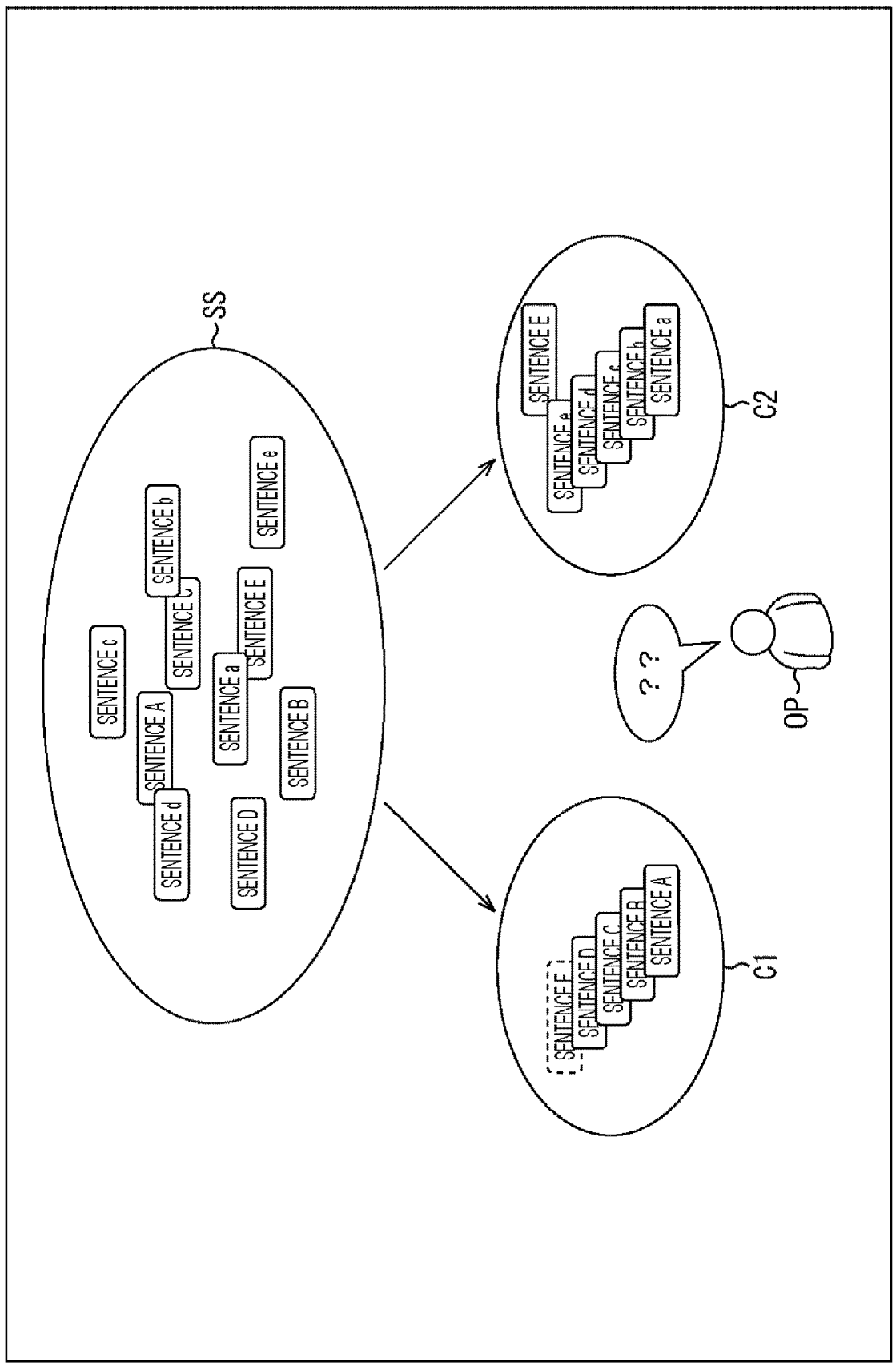
FIG. 1 is a diagram for explaining a problem of a prior art.

For example, as illustrated in FIG. 1, a case where a cluster is created by clustering a sentence set SS including a plurality of sentences A to E and a to e will be described as an example. In this case, although an operator OP who is a worker expects that a cluster C1 including the sentences A to E and the cluster C2 including the sentences a to e are created, the sentence E may be classified into a cluster C2.

Furthermore, it takes time and effort to determine whether or not a group of questions/answers having the same intention can be classified into existing FAQs. In a stage where data of a group of questions/answers is not sufficiently constructed, accuracy of FAQ retrieval is also low, it is difficult to find an appropriate existing FAQ, and it takes time and effort to confirm the existing FAQ.

Figure 2:
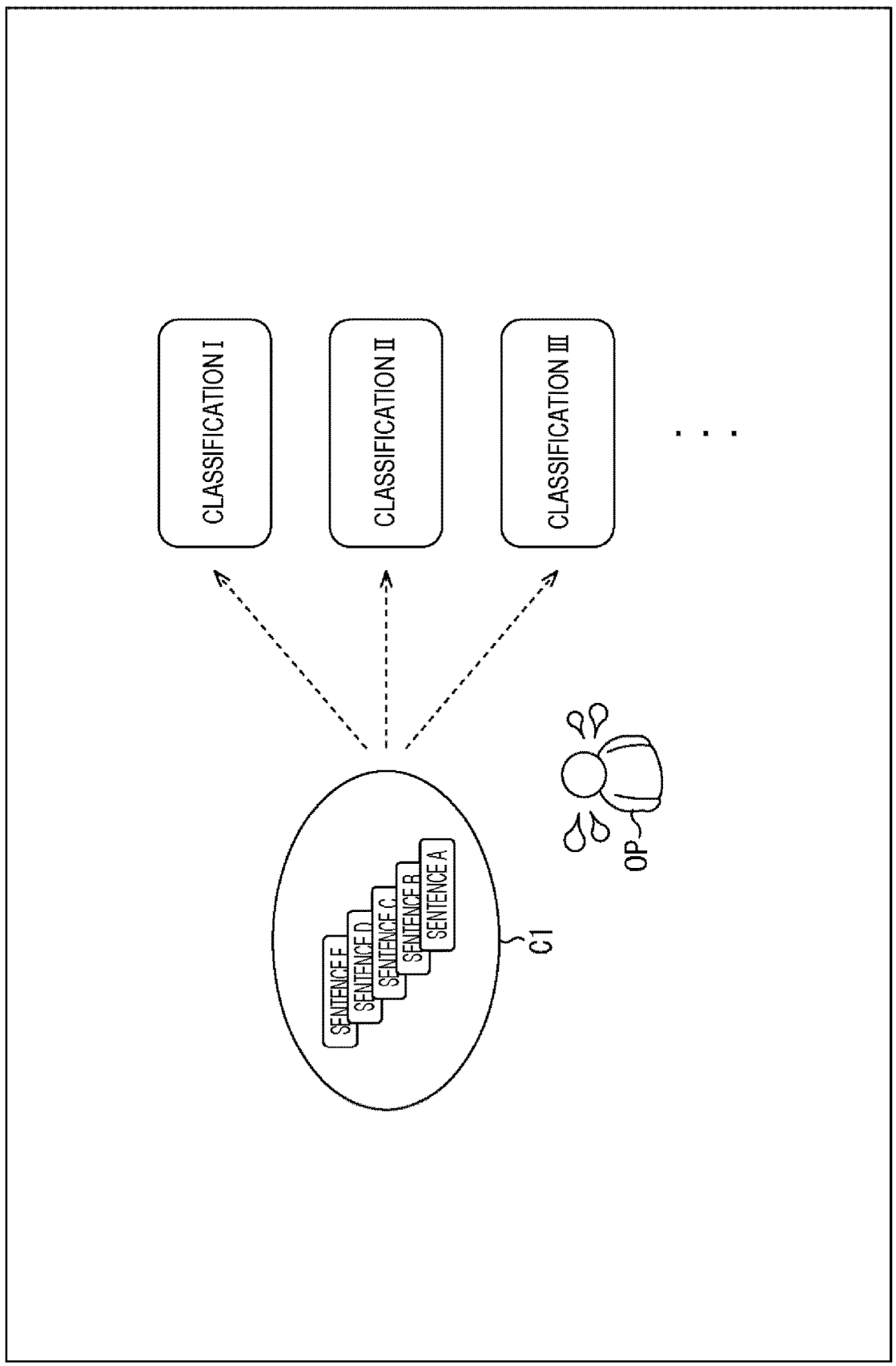
FIG. 2 is a diagram for explaining a problem of the prior art.

For example, as illustrated in FIG. 2, it is not easy for an operator OP to determine which one of classifications I, II, and III the cluster C1 including the sentences A to E applies to.

(Outline of Technology According to the Present Disclosure)

Therefore, with the technology according to the present disclosure, it is possible to support work of giving a classification to a group of sentences.

Specifically, the technology according to the present disclosure realizes creation of a set of questions having the same intention.

Figure 3:
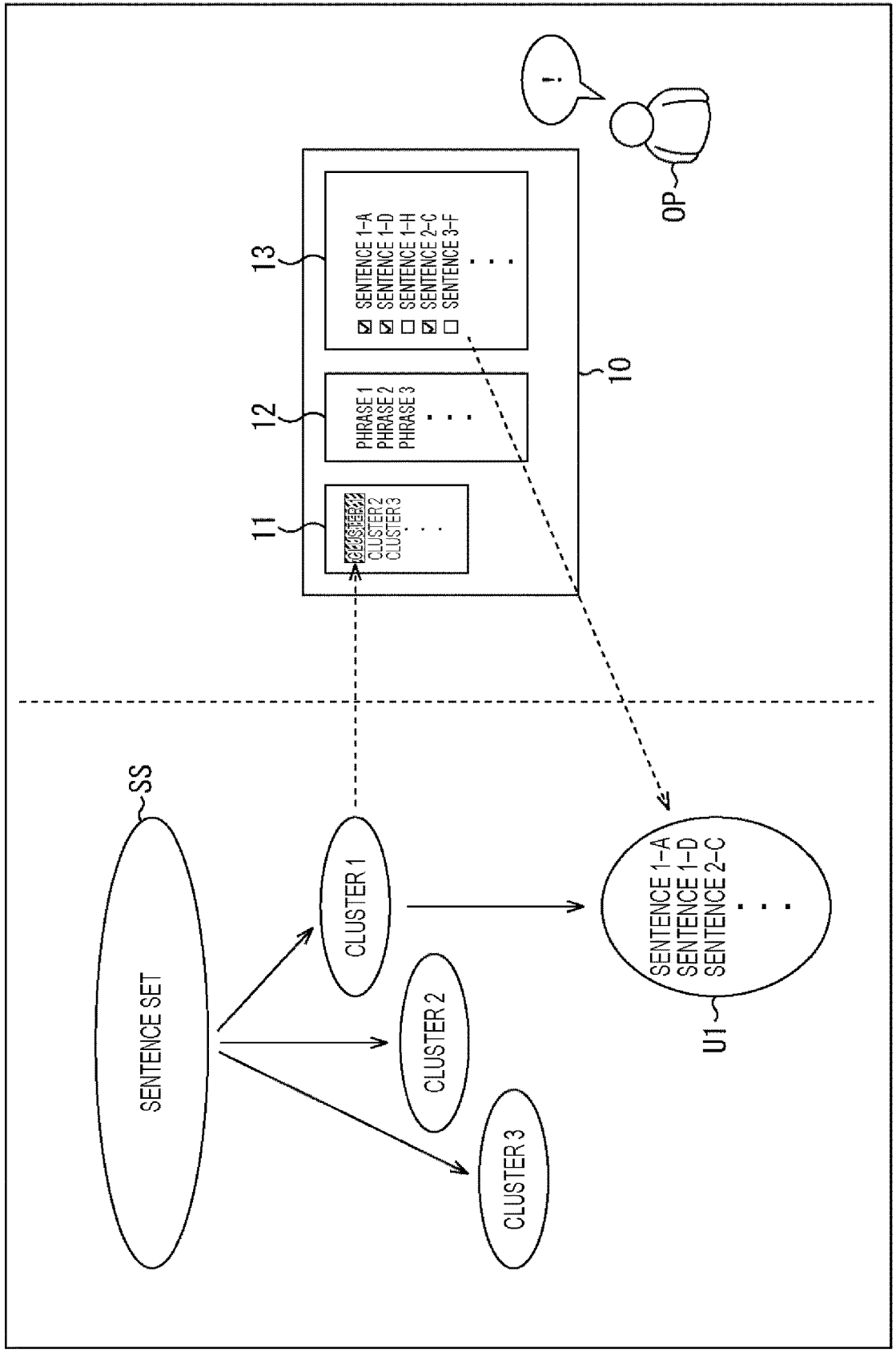
FIG. 3 is a diagram for explaining an outline of the technology according to the present disclosure.

For example, as illustrated in FIG. 3, on a screen 10, the result of clustering of the sentence set SS (clusters 1 to 3) is displayed in a cluster display region 11, and a phrase included in the selected cluster (also referred to as a cluster of interest) is presented in a phrase display region 12.

In the example of FIG. 3, a cluster 1 is selected as a cluster of interest, and a phrase 1, a phrase 2, and a phrase 3 included in the cluster 1 are presented in descending order of importance.

Therefore, the operator OP can grasp the characteristic keyword of the cluster of interest selected by the operator OP.

Moreover, on the screen 10, a sentence included in the cluster of interest is presented in a sentence selection region 13, and selection of a sentence constituting a group of sentences is received from the sentence presented in the sentence selection region 13. In the sentence selection region 13, the sentences included in the cluster of interest and the sentences not included in the cluster of interest are presented in the order based on the center of the cluster of interest.

In the example of FIG. 3, in addition to the sentences 1-A, 1-D, and 1-H included in the cluster 1 which is the cluster of interest, the sentence 2-C included in the cluster 2 which is not the cluster of interest and the sentence 3-F included in the cluster 3 are presented in the sentence selection region 13 in order of proximity to the center of the cluster 1. Then, in the sentence selection region 13, the sentences 1-A, 1-D, and 2-C are selected by the operator OP.

Therefore, the operator OP can create a group U1 of sentences as intended by the operator OP without missing the sentences to be included in the group.

Furthermore, with the technology according to the present disclosure, it is possible to facilitate determination as to which existing classification (FAQ) a group of sentences (questions/answers) having the same intention applies.

Figure 4:
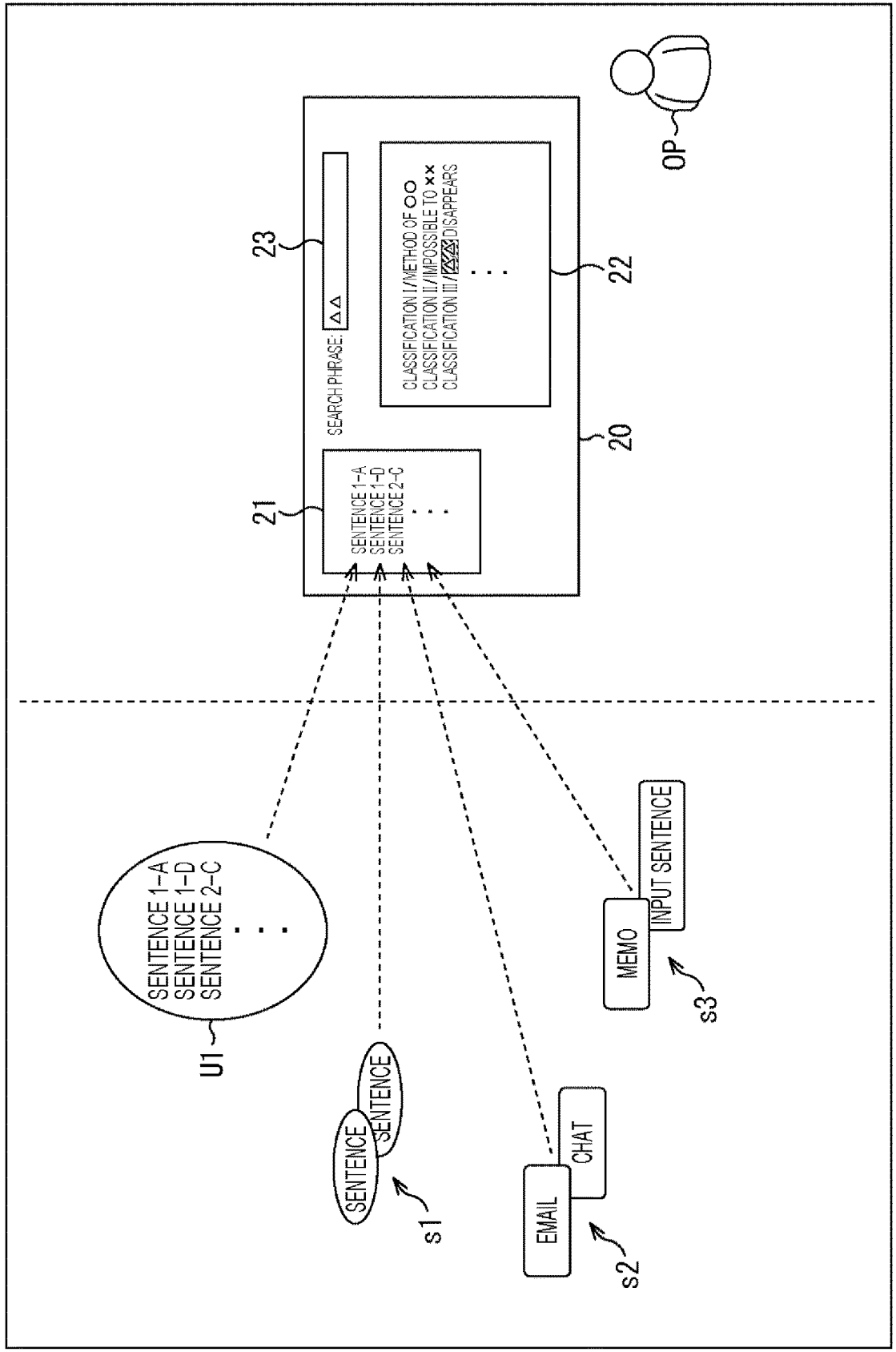
FIG. 4 is a diagram for explaining an outline of the technology according to the present disclosure.

Specifically, as illustrated in FIG. 4, on the screen 20, the sentences 1-A, 1-D, and 2-C constituting the group U1 of sentences are displayed in a sentence display region 21, and the existing classifications are presented in a classification presentation region 22 in the order based on the distance to the group U1 of sentences.

In the example of FIG. 4, in the classification presentation region 22, classifications I, II, and III are presented in order of decreasing distance to the group U1 of sentences (Sentence 1-A, 1-D, 2-C).

Therefore, the operator OP can easily determine which existing classification the group U1 of sentences applies to.

Note that a single sentence s1, a sentence s2 of an email or a chat from the user, and a sentence s3 of a memo or an input sentence input by the operator OP may be presented in the sentence display region 21. In this case, the existing classifications are presented in the classification presentation region 22 in the order based on the distances to the sentences s1 to s3.

Moreover, on a screen 20, an input region 23 that receives an input of a search phrase is presented, and a search of a classification including the search phrase specified by the operator OP from the classifications presented in the classification presentation region 22 is received. In the classification presentation region 22, the searched classification (classification filtered by the search phrase) is presented.

In the example of FIG. 4, "ΔΔ" as a search phrase is input to the input region 23, and classifications I, II, and III filtered by "ΔΔ" are presented in the classification presentation region 22. In particular, "ΔΔ" included in the name of classification II is highlighted.

Therefore, the operator OP can easily search for the classification including the intended phrase.

As described above, the technology according to the present disclosure can be applied to a configuration that provides classification to a group of sentences having the same intention in a sentence set.

Hereinafter, an example in which the sentence set is "past inquiry history (inquiry sentence)" and the classification is "FAQ" will be described. However, the sentence set may be "news" and the classification may be "category", or the sentence set may be "e-mail" and the classification may be "folder classification". Furthermore, the sentence set may be "patent specification", and the classification may be "patent search classification" and the like.

<2. Configuration of Information Processing System>

Figure 5:
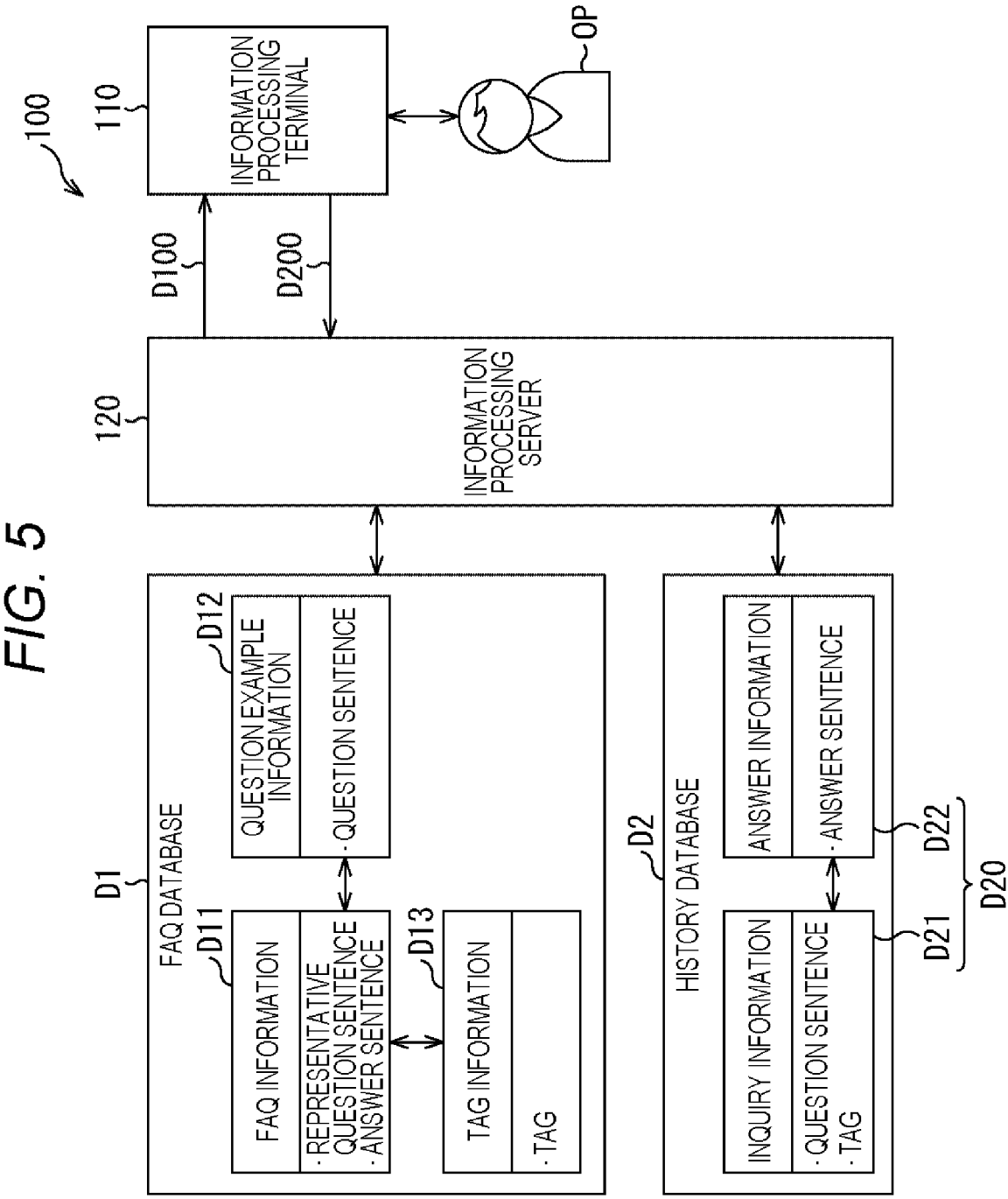
FIG. 5 is a diagram for explaining a configuration example of an information processing system according to an embodiment of the present disclosure.

FIG. 5 is a diagram illustrating a configuration example of an information processing system according to an embodiment of the present disclosure.

As illustrated in FIG. 5, an information processing system 100 is configured by an information processing terminal 110 as an information processing apparatus and an information processing server 120.

The information processing terminal 110 and the information processing server 120 are configured to be able to communicate via a network or directly communicate without the network, for example.

The information processing system 100 may be realized by, for example, a single computer, three or more computers, or the like. In the present embodiment, the operator OP constructs and searches for FAQ.

The information processing terminal 110 is configured by, for example, a personal computer (PC) used by the operator OP, and performs various types of information processing in cooperation with the information processing server 120. For example, the information processing terminal 110 causes the operator OP who has received an inquiry from the user to input an inquiry content and an answer. The information processing terminal 110 transmits the data input by the operator OP to the information processing server 120. The information processing terminal 110 displays various types of information received from the information processing server 120 on the display unit.

The information processing server 120 is configured as a so-called cloud server, and executes information processing in cooperation with the information processing terminal 110. The information processing server 120 may execute information processing in cooperation with a plurality of information processing terminals 110.

The information processing server 120 manages a set of a representative question and an answer indicating a solution to the question for each problem. For example, the information processing server 120 manages various types of information such as an FAQ database D1 and a history database D2.

The FAQ database D1 is a database that manages typical representative question sentences in a question-and-answer format.

The FAQ database D1 includes FAQ information D11, question example information D12, and tag information D13. In the present embodiment, it is assumed that the question example information D12 and the tag information D13 are associated with each other in the FAQ information D11, but at least one of the question example information D12 and the tag information D13 may be configured to be associated.

The FAQ information D11 includes, for example, information indicating a representative question sentence and an answer sentence to the representative question sentence. The representative question sentence is information indicating a question sentence from the user assumed in advance. The answer sentence is information indicating an answer to the representative question sentence. In the present embodiment, one piece of FAQ information D11 is provided corresponding to one representative question sentence.

The question example information D12 is, for example, information indicating a question sentence similar to the representative question sentence of the FAQ information D11. The question example information D12 is associated with the FAQ information D11 having a similar representative question sentence. The question example information D12 may have a plurality of question sentences associated with one piece of FAQ information D11.

For example, it is assumed that a representative question sentence of the FAQ information D11 is "compact disc (CD) or digital versatile disc (DVD) cannot be taken out from PC". In this case, the question example information D12 associated with the FAQ information D11 includes, for example, question sentences such as "CD is not coming out", "DVD cannot be ejected", "CD does not come out", "DVD does not come out", and "Disc cannot be taken out".

The tag information D13 is information appropriately indicating the contents of the FAQ information D11, and is information set for searching the FAQ information D11. The tag information D13 is information indicating conditions such as the state of the user, the electronic device to be questioned, and the state of the electronic device. The tag information D13 is unique information in the FAQ database D1 and is associated with a plurality of pieces of FAQ information D11.

The history database D2 is a database that manages a history of reception to the user.

The history database D2 includes one or a plurality of pieces of history information D20. The history information D20 is, for example, information corresponding to one reception on a one-to-one basis. The history information D20 includes inquiry information D21 and answer information D22. The inquiry information D21 and the answer information D22 are, for example, information indicating natural language, voice, and the like.

The inquiry information D21 includes, for example, information indicating at least one of a question sentence and a tag. The question sentence is information indicating an actual question sentence from the user. The tag includes information for classifying a question, a keyword, a model, and the like from the user, information indicating a tag designated by the user, and the like.

The answer information D22 includes, for example, information indicating an answer sentence. The answer information D22 includes, for example, information indicating a reception to an actual question from the user. The reception includes, for example, an action in which the operator OP or the like creates an answer sentence on the basis of an existing business document. The business document includes, for example, information indicating a reception manual, a contract, an FAQ, and the like. The reception includes, for example, an action in which the information processing server 120 provides information to the user. The answer information D22 may include, for example, reference information indicating a business document referred to by the operator OP, a link to information referred to by the operator OP, and the like.

For example, upon receiving a request from the information processing terminal 110, the information processing server 120 creates support information D100 on the basis of at least one of the inquiry information D21 and the answer information D22 stored in the history database D2, and causes the information processing terminal 110 to display the support information D100. The support information D100 is, for example, information for supporting at least one of construction and search of the FAQ database D1. The support information D100 includes, for example, a graphical user interface (GUI) such as an object or an input screen that supports, for example, the operator OP to input and select various types of information.

The information processing terminal 110 supports construction and search of the FAQ database D1 by displaying the support information D100 to the operator OP. Then, the operator OP considers and determines construction and search of the FAQ information D11 by referring to the support information D100, and inputs to the support information D100. The information processing terminal 110 transmits input information D200 input by the operator OP to the information processing server 120.

The information processing server 120 executes processing of constructing and searching the FAQ database D1 on the basis of the support information D100. For example, the information processing server 120 executes processing of adding the new FAQ information D11 to the FAQ database D1 or changing the existing FAQ information D11.

For example, the information processing server 120 executes processing of changing or deleting at least one of the question example information D12 and the tag information D13 associated with the FAQ information D11. Furthermore, the information processing server 120 executes processing of adding at least one of the question example information D12 and the tag information D13 to the FAQ information D11.

As a result, the information processing system 100 can cause the operator OP to input the input information D200 for constructing and searching the FAQ information D11 by creating the support information D100 based on the history of reception by the information processing server 120. Therefore, the information processing system 100 can suppress the burden on the operator OP who constructs and searches the representative question sentence and the answer sentence on the basis of the history of reception to the user. Furthermore, the information processing system 100 can support the operator OP to extract valid information for improving the search accuracy of the FAQ database D1 by the support information D100.

In the information processing system 100, work of giving an existing or new classification to a sentence set, that is, work of identifying an FAQ that can answer the inquiry information D21 (inquiry sentence) of the history database D2 is mainly performed for the following three purposes.

(1) Search an inquiry that has not yet been associated with an FAQ, and create an FAQ particularly for frequent inquiries.
(2) Count the number of inquiries in units of existing or new FAQ, and give priority to improvement of products/services and FAQ content.
(3) Construct a search model for searching FAQs suitable for inquiring various expressions.

In the work of providing the classification, there is also a method of providing the classification for each sentence extracted one by one from the sentence set, but this is not efficient because it is necessary to repeat the work by the number of sentences. It is more efficient to put sentences having the same intention as much as possible together and give a classification. In the present embodiment, a group of sentences is created on the basis of a combination of phrases, and selection of sentences constituting the group of sentences to be created is received, so that it is realized that sentences having the same intention are collectively classified.

Figure 6:
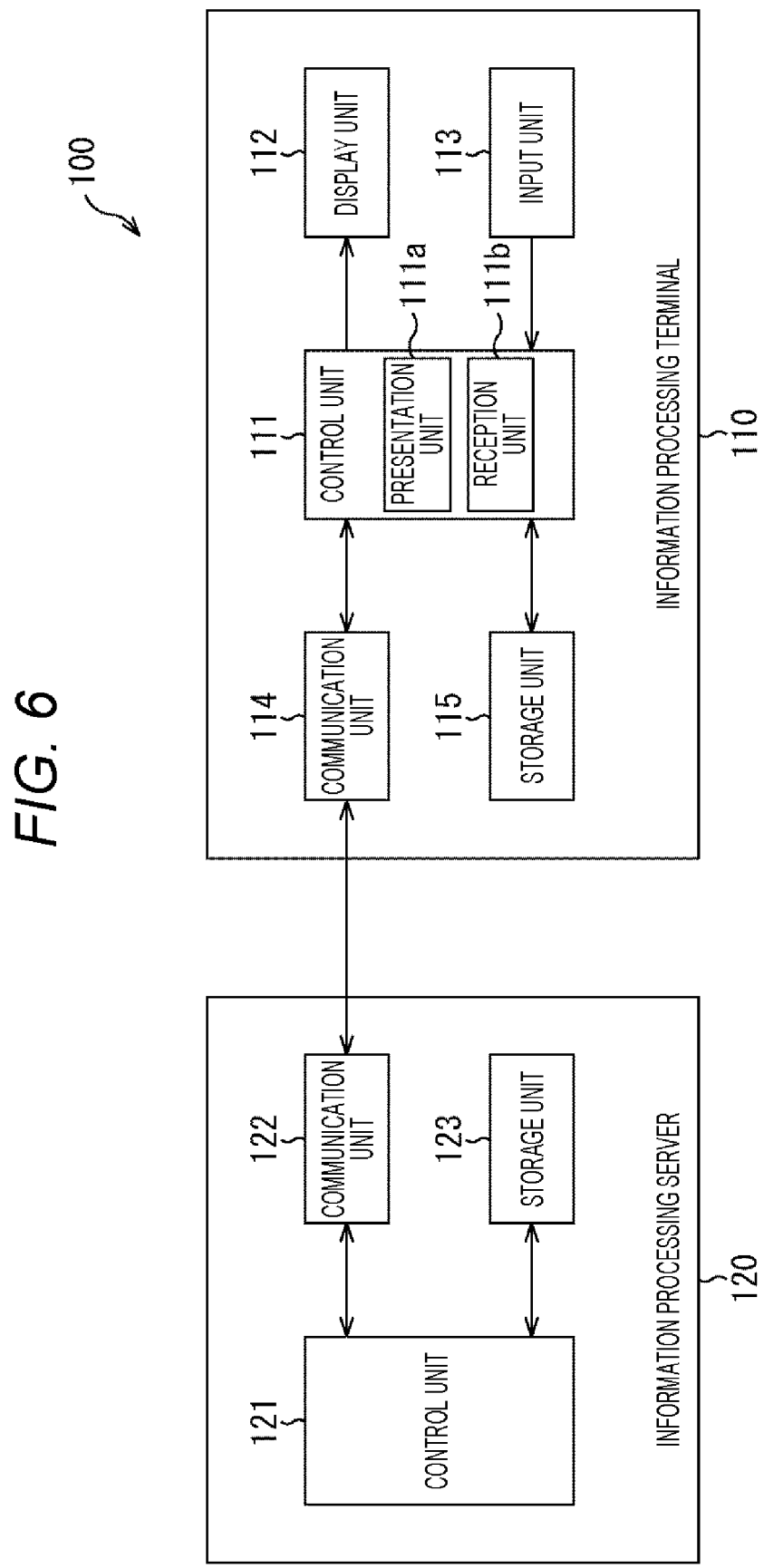
FIG. 6 is a block diagram illustrating a functional configuration example of an information processing system.

FIG. 6 is a block diagram illustrating a functional configuration example of the information processing system 100.

(Configuration of Information Processing Terminal)

The information processing terminal 110 includes a control unit 111, a display unit 112, an input unit 113, a communication unit 114, and a storage unit 115.

The control unit 111 controls each configuration included in the information processing terminal 110.

For example, the control unit 111 causes the display unit 112 to output various types of information generated by the information processing server 120. Furthermore, the control unit 111 provides the information input from the input unit 113 to the information processing server 120 and executes processing requested from the information processing server 120. The control unit 111 supports the operator OP by executing the above processing.

Furthermore, the control unit 111 includes a presentation unit 111a that presents various types of information in the display unit 112, and a reception unit 111b that receives an operation of the operator OP on the input unit 113.

The display unit 112 displays various types of information on the basis of the control of the control unit 111. The display unit 112 displays, for example, the support information D100 received from the information processing server 120 or the like.

The display unit 112 includes, for example, a display device that displays various types of information or the like. Examples of the display device include a liquid crystal display (LCD) device, an organic light emitting diode (OLED) device, a touch panel, and the like. Furthermore, the display unit 112 may output the support information D100 or the like by a projection function.

The input unit 113 includes an input device for the operator OP to perform an operation such as input or selection. The input device includes, for example, a keyboard, a mouse, and the like. The input unit 113 may include, for example, a microphone for collecting the voice of the operator OP. The input unit 113 outputs the input information to the control unit 111.

The communication unit 114 communicates with the information processing server 120 via a network. Specifically, the communication unit 114 transmits the information input to the input unit 113 to the information processing server 120 as the input information D200. Furthermore, when receiving information such as the support information D100 from the information processing server 120, the communication unit 114 outputs the information to the control unit 111.

The storage unit 115 stores various data and programs. For example, the storage unit 115 is, for example, a semiconductor memory element such as a random access memory (RAM) or a flash memory, a hard disk, an optical disk, or the like. The storage unit 115 stores an application program and the like for supporting the operator OP. Note that the storage unit 115 may be provided in a cloud server or the like connected to the information processing terminal 110 via a network.

(Configuration of Information Processing Server)

The information processing server 120 includes a control unit 121, a communication unit 122, and a storage unit 123.

The control unit 121 controls the operation of the information processing server 120. The control unit 121 is implemented by, for example, a central processing unit (CPU), a micro-processing unit (MPU), or the like executing a program using a RAM or the like as a work area. Furthermore, the control unit 121 may be realized by, for example, an integrated circuit such as an application specific integrated circuit (ASIC) or a field-programmable gate array (FPGA).

The communication unit 122 communicates with the information processing terminal 110 via a network. Specifically, the communication unit 122 transmits information such as the support information D100 from the control unit 121 to the information processing terminal 110. Furthermore, when receiving information such as the input information D200 from the information processing terminal 110, the communication unit 122 outputs the information to the control unit 121.

The storage unit 123 is configured by, for example, a semiconductor memory element such as a RAM or a flash memory, or a storage device such as a hard disk or an optical disk. The storage unit 123 stores information such as the FAQ database D1 and the history database D2 described above, but is not limited thereto. For example, at least one of the FAQ database D1 and the history database D2 may be stored in an external storage device or the like accessible by the information processing server 120.

(Explanation of Terms Related to Natural Language Processing)

The information processing server 120 realizes classification of sentences by using natural language processing. Here, terms related to natural language processing will be briefly described.

Sentence vector: In natural language processing, it is necessary to convert a sentence into a format that can be mechanically calculated. In the case of Japanese, the sentence is replaced with a phrase string by performing the morphological analysis. Phrases are filtered by part of speech, and those that do not easily affect the meaning of the sentence, such as particles, are removed. Moreover, a phrase is numbered in a dictionary to be replaced with an ID. In general, a sentence is expressed by a vector having the ID as a feature amount dimension and the appearance frequency of a phrase as a value. Furthermore, the sentence vector may be weighted using a term frequency-inverse document frequency (tf-idf), or a dimensionally compressed feature amount may be used in order to absorb a small difference between phrases.

tf-idf: It is empirically known that the importance of phrases appearing in various sentences is low, and the importance of phrases often appearing in a specific sentence is high. In general, this rule of thumb is called tf-idf and can be widely used in calculating the importance of a phrase.

Sentence group vector: In order to represent a feature of a sentence set, it is common to take an average of vectors of all sentences included in the set. In addition to calculating the single sentence group vector from the sentence group, the sentence group vector may be calculated while respectively holding the vector of each sentence included in the sentence group.

Inter-sentence distance: It can be obtained by a cosine distance between sentence vectors.

Sentence group-sentence distance: The distance between the sentence group and the sentence can be obtained by the cosine distance between the averaged sentence group vector and the sentence vector of 1, or the respective cosine distance between the vector of each sentence included in the sentence group and the sentence vector of 1 and using the minimum value and the maximum value.

Clustering: A feature amount vector of a sentence can be obtained by a known method such as a K-means method.

similarity: In general, a feature amount of a phrase can be calculated from a sentence by an existing technology such as Word2Vec. The similarity between phrases can be calculated by the cosine distance of the feature amount. Furthermore, similarly to the sentence group, the similarity between a phrase group and a phrase can be obtained by obtaining respective distances to an average vector of a plurality of phrases and all phrases included in the phrase group, and using a minimum value and a maximum value thereof.

<3. Presentation of Information for Creating a Group of Sentences>

Figure 7:
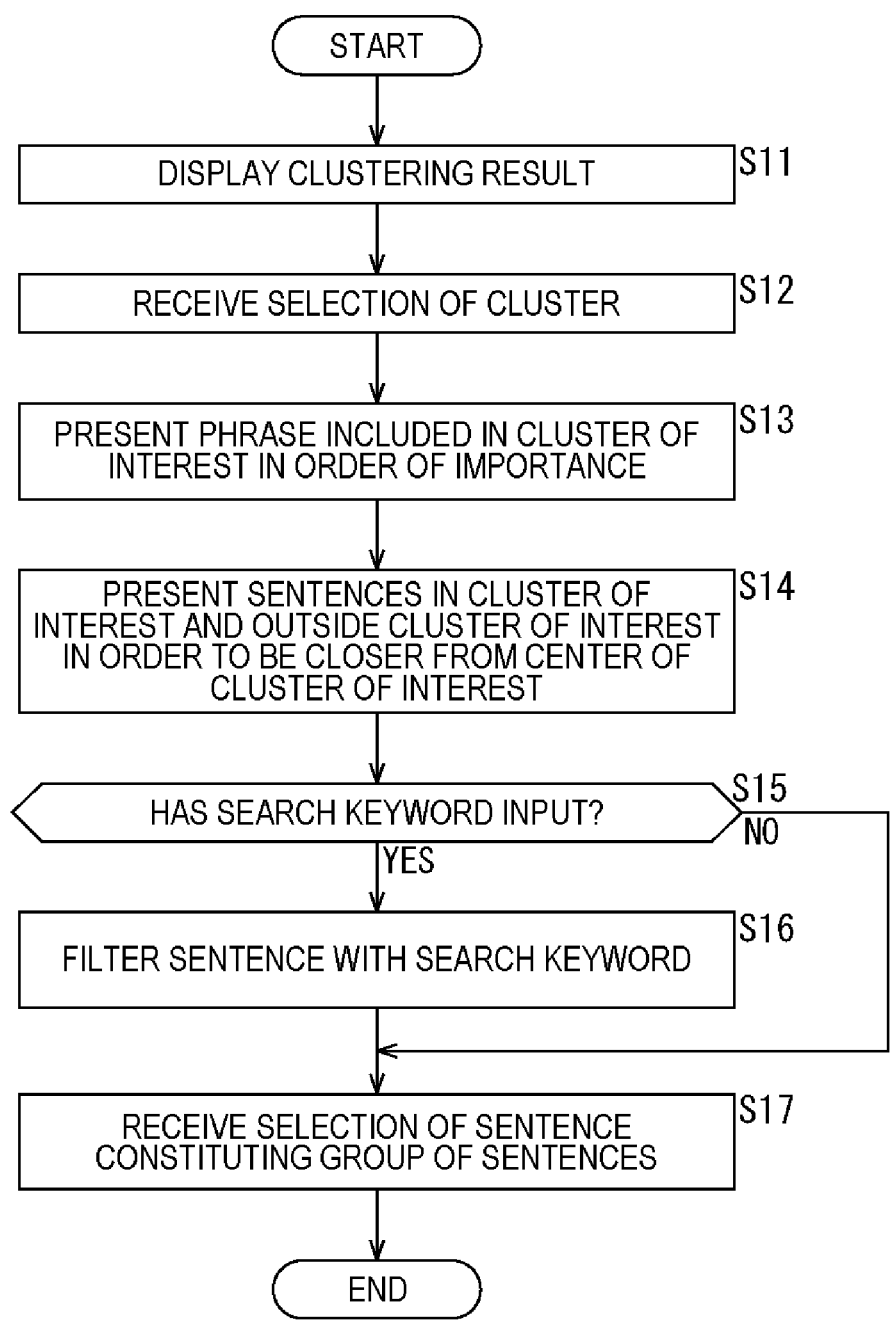
FIG. 7 is a flowchart for explaining processing of presenting information for creating a group of sentences.

First, processing in which the information processing terminal 110 presents information for creating a group of sentences on the basis of a clustering result of a sentence set will be described with reference to the flowchart of FIG. 7. The processing of FIG. 7 is executed by an application (hereinafter, referred to as an FAQ construction/search support tool) that supports construction and search of FAQ.

In Step S11, the presentation unit 111*a* displays a plurality of clusters that is the clustering result of the sentence set on the display screen displayed on the display unit 112.

In Step S12, the reception unit 111*b* receives cluster selection on the display screen displayed on the display unit 112.

In Step S13, the presentation unit 111*a* presents phrases included in the selected cluster (cluster of interest) on the display screen displayed on the display unit 112 in order of importance.

Moreover, in Step S14, the presentation unit 111*a* presents the sentences in the cluster of interest and the sentences outside the cluster of interest in a sentence selection region on the display screen displayed on the display unit 112 in order from the center of the cluster of interest.

Thereafter, in Step S15, the reception unit 111*b* determines whether or not the search keyword (search phrase) designated by the operator OP has been input to the input region on the display screen displayed on the display unit 112.

In a case where the search keyword is input, the process proceeds to Step S16, and the presentation unit 111*a* filters the sentence presented in the sentence selection region with the input search keyword. Thereafter, the process proceeds to Step S17.

On the other hand, in a case where the search keyword is not input, Step S16 is skipped.

In Step S17, the reception unit 111*b* receives selection of a sentence constituting a group of sentences in the sentence selection region.

According to the above processing, the operator OP can more reliably create a group of sentences having the same intention.

(Example of GUI)

Hereinafter, an example of the GUI on the display screen displayed on the display unit 112 in the processing of FIG. 7 described above will be described.

Figure 8:
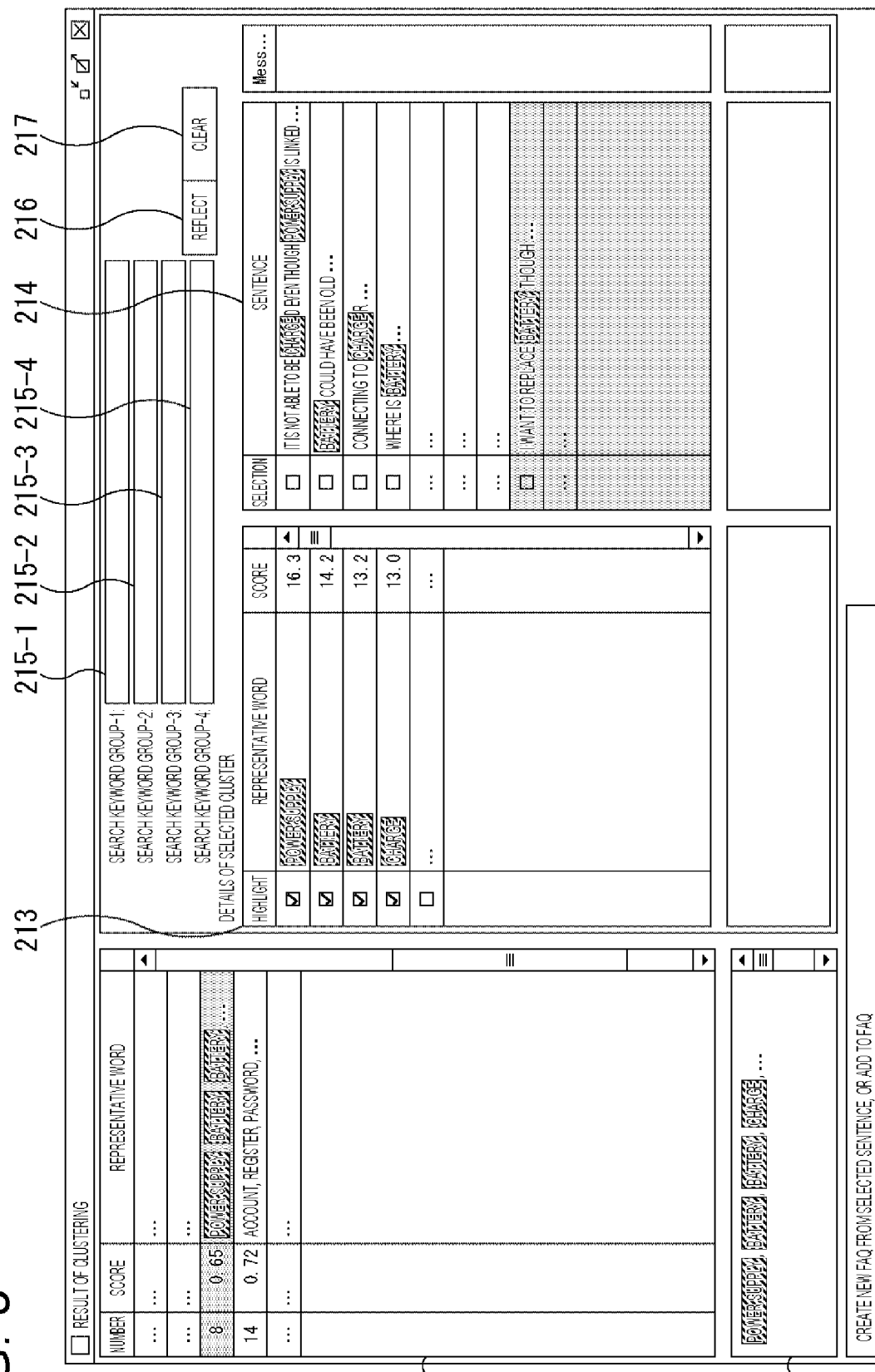
FIG. 8 is a diagram illustrating an example of a GUI.

FIG. 8 is a diagram illustrating an example of a GUI.

FIG. 8 illustrates an example of a window displayed by the FAQ construction/search support tool.

In the window of FIG. 8, a clustering result of a past inquiry history (question sentence) which is a sentence set is displayed in a cluster display region 211.

In the cluster display region 211, a plurality of clusters is displayed in a list form.

In the cluster display region 211, for each cluster, the number of question sentences included in the cluster, a score indicating a distance between the cluster and a representative question sentence of an existing FAQ, and a representative phrase included in the cluster are displayed.

In the example of FIG. 8, the plurality of clusters is displayed in ascending order of scores (in order of distance from the existing FAQ), in other words, in order in which it is considered that an answer cannot be made to the existing FAQ, but may be displayed in descending order of scores (in order of proximity to the existing FAQ).

Therefore, the operator OP can process from a question close to a familiar FAQ, or can process from a question that cannot be covered by an existing FAQ when it is necessary to create a new FAQ.

In a phrase display region 212, representative phrases ("power supply", "battery", "battery", "charge", . . . ) included in a cluster (cluster of interest) selected in the cluster display region 211 are displayed in descending order of importance.

Also in a phrase display region 213, representative phrases ("power supply", "battery", "battery", "charge", . . . ) included in the cluster of interest are displayed in a list form in descending order of importance.

In the phrase display region 213, a check box and a score indicating the degree of importance are displayed for each phrase. When the check box is checked, the phrase is highlighted. Note that a predetermined number of phrases of high importance may be automatically marked with a check mark and highlighted.

In this manner, a phrase presented as a phrase having a high degree of importance is hereinafter also referred to as an automatically suggested phrase.

Since the clusters displayed in the cluster display region 211 are only generated on the basis of an optimum combination in terms of a calculation model, it is necessary to manually perform final meaning for each cluster.

Therefore, by displaying the phrases included in the selected cluster in descending order of importance, it is possible to facilitate the meaning of the cluster.

In a sentence selection region 214, the sentences included in the cluster of interest and the sentences not included in the cluster of interest are presented in a list form in order (specifically, in the order of proximity from the center of the cluster of interest) based on the cluster of interest. The sentence not included in the cluster of interest is displayed in a mode different from the sentence included in the cluster of interest, specifically, its background is displayed in gray. Note that, in the sentence presented in the sentence selection region 214, the automatically suggested phrase ("power supply", "battery", "battery", "charge") is highlighted.

Therefore, the operator OP can simultaneously check not only the sentence included in the selected cluster of interest but also the sentence close to the cluster of interest.

In the sentence selection region 214, a check box is displayed for each sentence. By adding a check mark to the check box, selection of a sentence constituting a group of sentences is received.

Moreover, in the window of FIG. 8, input regions 215-1 to 215-4 are presented as GUIs for accepting input of a search keyword (search phrase) designated by the user (search of a sentence including the search phrase). Hereinafter, in a case where the input regions 215-1 to 215-4 are not distinguished from each other, they are simply referred to as an input region 215.

When a reflection button 216 is operated in a state where the search keyword is input to any one of the input regions 215, the sentence including the search keyword is searched from the sentence presented in the sentence selection region 214 (the sentence is filtered by the search keyword). The searched (filtered) sentence is presented in the sentence selection region 214. Furthermore, when a clear button 217 is operated, the search keyword input to each of the input regions 215 is cleared (erased).

In each of the input regions 215, an input of a plurality of search keywords is received.

In a case where a plurality of search keywords is input to one input region 215, OR search using the plurality of input search keywords is performed. Furthermore, in a case where the search keyword is input across the plurality of input regions 215, AND search using each input search keyword is performed.

For example, it is assumed that the reflection button 216 is operated in a state where "word A", "word B", "word C", and "word D" are input to the input region 215-1, and "word E", "word F", and "word G" are input to the input region 215-2. In this case, a search such as {(word A) OR (word B) OR (word C) OR (word D)} AND {(word E) OR (word F) OR (word G)} is performed.

In the present embodiment, it is assumed that search is performed with partial coincidence for a plurality of sentences to be searched. Note that, although not illustrated, an input region for performing the NOT search may be separately provided.

Furthermore, for example, a right click operation with a mouse is performed on the input region 215 where the search keyword is not input, so that a candidate keyword (candidate phrase) as a candidate of the search keyword input to the input region 215 is presented.

Figure 9:
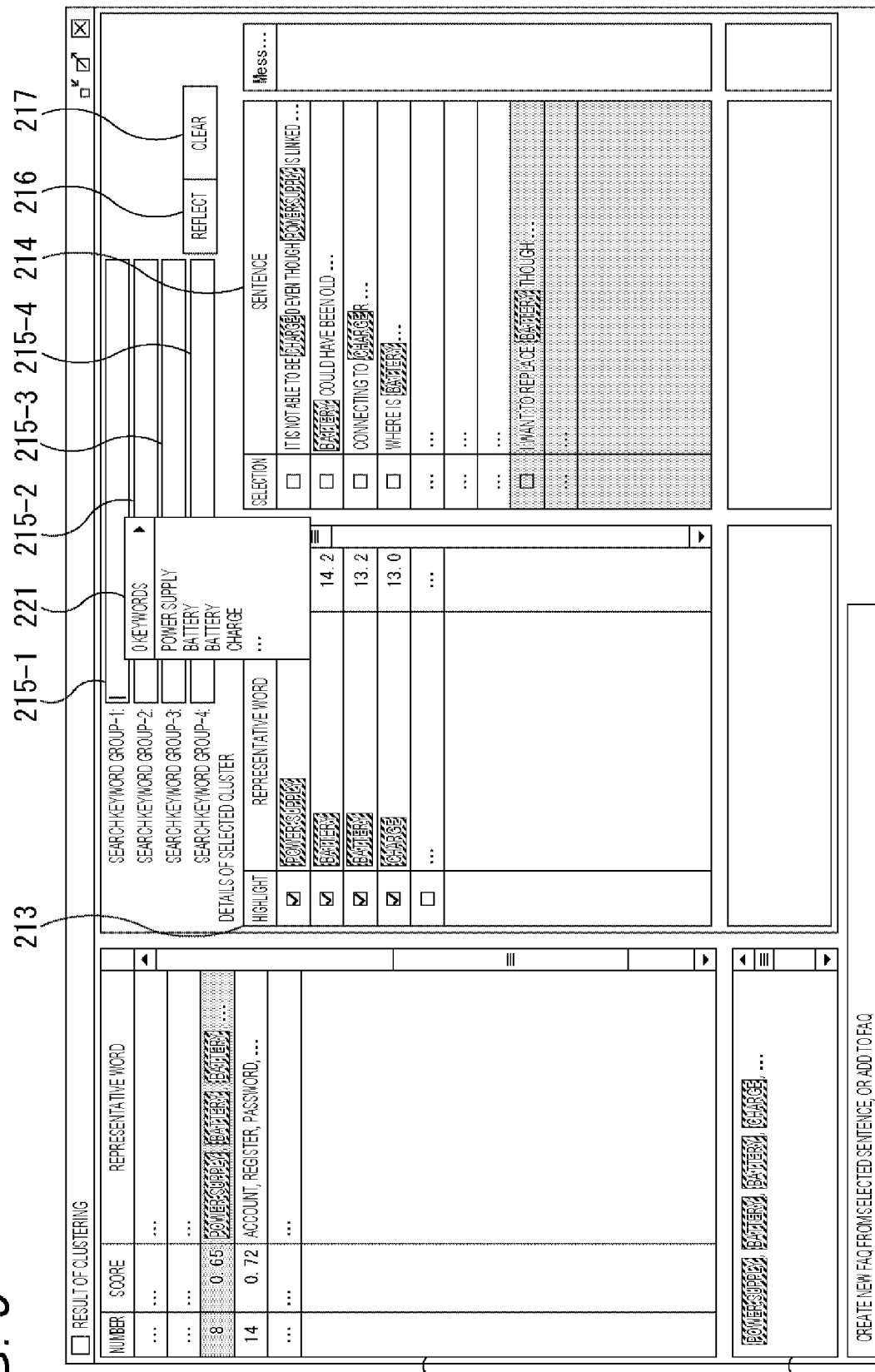
FIG. 9 is a diagram illustrating an example of a GUI.

For example, as illustrated in FIG. 9, when a right click operation is performed on the input region 215-1 in which the search keyword is not input, a candidate keyword menu 221 is displayed.

In the candidate keyword menu 221, phrases ("power supply", "battery", "battery", "charge", . . . ) included in a cluster of interest are presented as candidate keywords in descending order of importance. Note that the "0 keywords" shown at the top of the candidate keyword menu 221 will be described later.

The operator OP can input the search keyword to the input region 215 by selecting a phrase presented in the candidate keyword menu 221.

Moreover, for example, when a right click operation is performed on the input region 215 where the search keyword has already been input, a synonym (similar keyword) similar to the search keyword already input in the input region 215 is presented.

Figure 10:
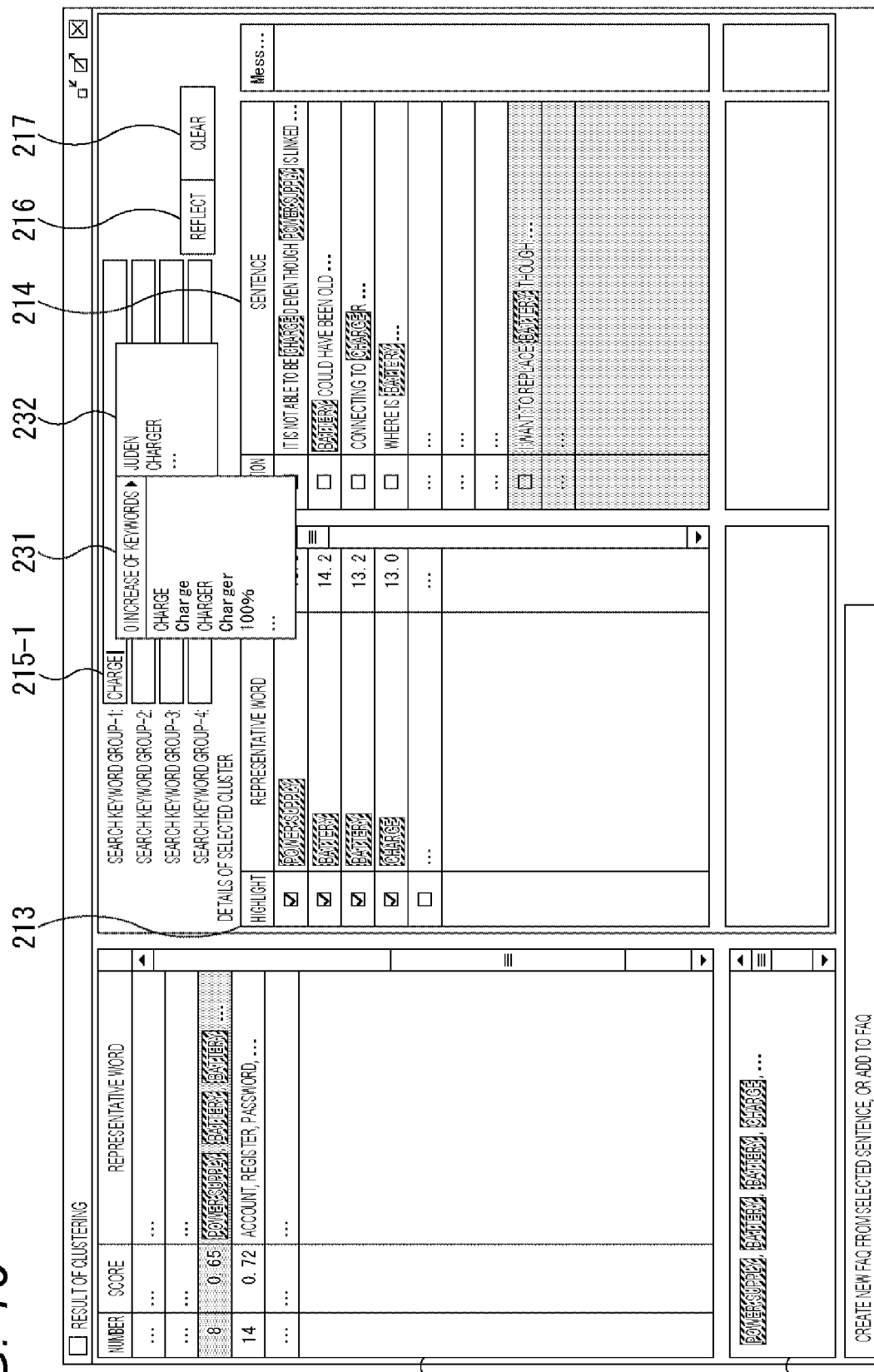
FIG. 10 is a diagram illustrating an example of a GUI.

For example, as illustrated in FIG. 10, when a right click operation is performed on input region 215-1 where the search keyword "charge" is input, a similar keyword menu 231 is displayed.

In the similar keyword menu 231, synonyms ("charge", "Charge", "charger", "Charger", "100%", . . . ) of "charge" already input in the input region 215-1 are presented as similar keywords in descending order of the similarity. Note that "0-increased keyword" shown at the top of the similar keyword menu 231 will be described later.

The operator OP can input a further search keyword to the input region 215 by selecting a phrase presented in the similar keyword menu 231.

Note that, in a case where a plurality of search keywords is input to the input region 215, similar keywords based on the similarity to the plurality of search keywords are presented.

Furthermore, the operator OP can also receive editing of the search keyword already input in the input region 215 or direct input of the search keyword into the input region 215. In particular, in the present embodiment, since the search is performed by partial matching, it is possible to increase the number of candidate sentences by editing the search keyword to be short.

Meanwhile, as illustrated in FIG. 10, in a case where the "0-increased keyword" in the similar keyword menu 231 is selected, a 0-increased keyword menu 232 is displayed to be distinguished from the similar keyword menu 231.

In the 0-increased keyword menu 232, among the similar keywords, the 0-increased keyword ("juden", "charger", . . . ), which is a similar keyword having no influence on the increase or decrease of the sentence presented in the sentence selection region 214, is presented. That is, the 0-increased keyword is a phrase in which the number of sentences to be presented in the sentence selection region 214 does not increase even in a case where the 0-increased keyword is added to the input region 215 as the OR search condition.

In the first place, the purpose of adding the search keyword as the OR search condition to the input region 215 is to increase the number of sentences presented in the sentence selection region 214. Therefore, by presenting the 0-increased keyword, the operator OP can know in advance a phrase in which the number of sentences to be presented in the sentence selection region 214 does not increase.

Note that, by intentionally presenting the 0-increased keyword without hiding, it is possible to increase the number of sentences to be presented in the sentence selection region 214 by further synonyms of this phrase, and it is possible to leave a possibility that the number of sentences to be presented in the sentence selection region 214 increases by editing this phrase.

Furthermore, in the example of FIG. 11, in a state where the search keyword "charge" is input in the input region 215-1, a right click operation is performed on the input region 215-2 where the search keyword is not input, whereby a candidate keyword menu 241 is displayed.

In a case where "0 keyword" in the candidate keyword menu 241 is selected in this state, a 0-keyword menu 242 is displayed to be distinguished from the candidate keyword menu 241.

In the 0-keyword menu 241, among the candidate keywords, the 0 keyword ("battery", . . . ) which is a candidate keyword in which the sentence to be presented in the sentence selection region 214 becomes 0 is presented. That is, the 0 keyword is a phrase in which the number of sentences presented in the sentence selection region 214 is 0 in a case where the 0 keyword is added to the input region 215 as a condition of the AND search.

In the example of FIG. 11, since "charge" is input as the search keyword in the input region 215-1, "battery" presented in the 0 keyword menu 241 is added as the condition of the AND search, so that the number of sentences presented in the sentence selection region 214 is 0. Therefore, the operator OP can know in advance the phrase in which the number of sentences to be presented in the sentence selection region 214 is 0.

Note that, by intentionally presenting the 0 keyword without hiding the 0 keyword, it is possible to increase further synonyms of this phrase, or by editing this phrase, it is possible to leave a possibility that the number of sentences presented in the sentence selection region 214 is not 0.

Furthermore, in the example of FIG. 11, "power supply", "battery", "impossible", . . . are presented as phrases of high importance in the cluster of interest in the candidate keyword menu 241, but "charge" already input in the input region 215-1 is omitted in the candidate keyword menu 241.

Figure 12:
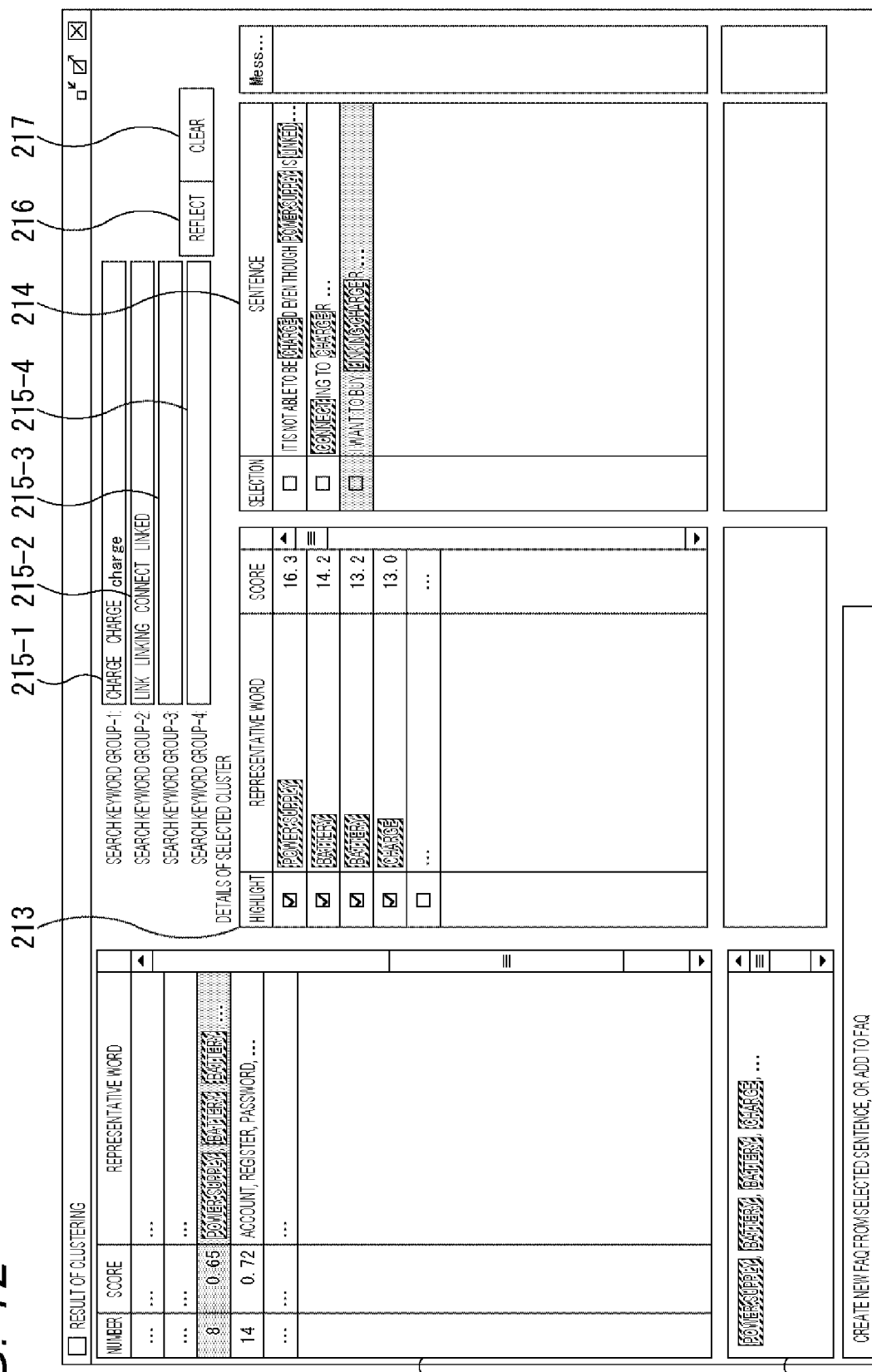
FIG. 12 is a diagram illustrating an example of a GUI.

As described above, the sentence presented in the sentence selection region 214 is filtered by the search keyword input to the input region 215 as illustrated in FIG. 12.

In the example of FIG. 12, "charge", "charge", and "charge" are input as the search keywords to the input region 215-1, and "link", "linking", "connect", and "linked" are input as the search keywords to the input region 215-2. Therefore, a search such as {(charge) OR (charge) OR (charge)} AND {(link) OR (linking) OR (connect) OR (linked)} is performed.

As a result, three sentences filtered by these search keywords are presented in the sentence selection region 214.

Also in the example of FIG. 12, the background of the sentence not included in the cluster of interest is displayed in gray in the sentence selection region 214. Furthermore, in the sentence presented in the sentence selection region 214, the search keywords input to the input regions 215-1 and 215-2 are highlighted in addition to the automatically suggested phrase ("power supply", "battery", "battery", "charge").

With the above configuration, the operator OP can filter the sentence presented in the sentence selection region 214 with the phrase specified by the operator OP. Then, when the button 218 is operated after the filtering, a group of sentences to which a check mark is attached in the sentence selection region 214 is created.

Figure 13:
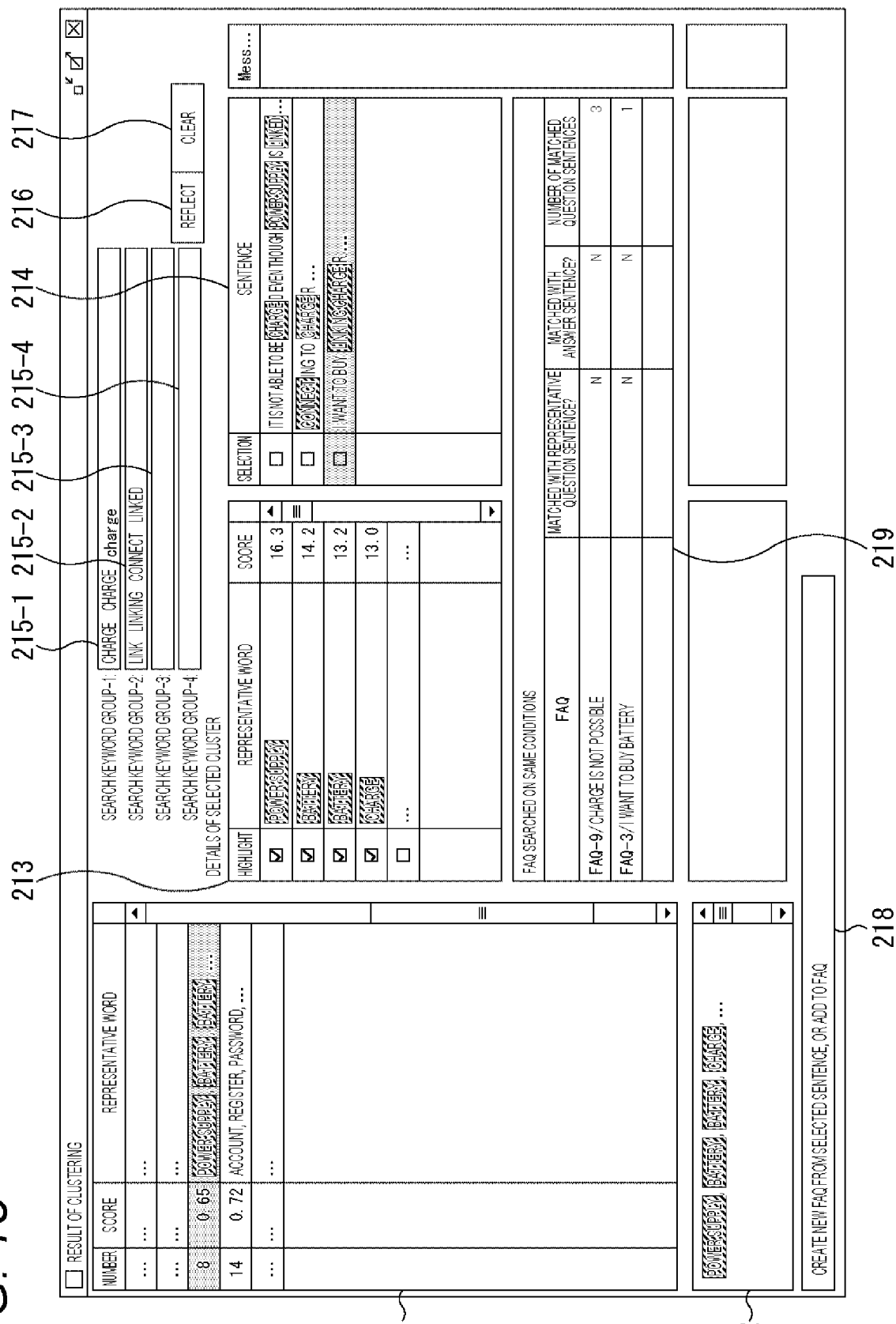
FIG. 13 is a diagram illustrating an example of a GUI.

Furthermore, the sentence presented in the sentence selection region 214 may be filtered by the search keyword input to the input region 215, and the classification (FAQ) given to the sentence may be filtered as illustrated in FIG. 13.

In the example of FIG. 13, a classification display region 219 is provided below the phrase display region 213 and the sentence selection region 214, and the names of FAQ filtered by the search keyword input to the input region 215 are displayed in a list form.

In the classification display region 219, for each filtered FAQ, a true/false value indicating whether or not a representative question sentence and an answer sentence of the FAQ match a search condition (filtering condition) and the number of question examples matching the search condition are displayed as statistical information of filtering.

Therefore, the operator OP can roughly grasp the presence or absence of the possibility that the corresponding classification exists before giving the classification (FAQ) to the sentence.

In the above description, the input regions 215-1 to 215-4 are presented as GUIs related to the search keywords, but other configurations may be used.

Figure 14:
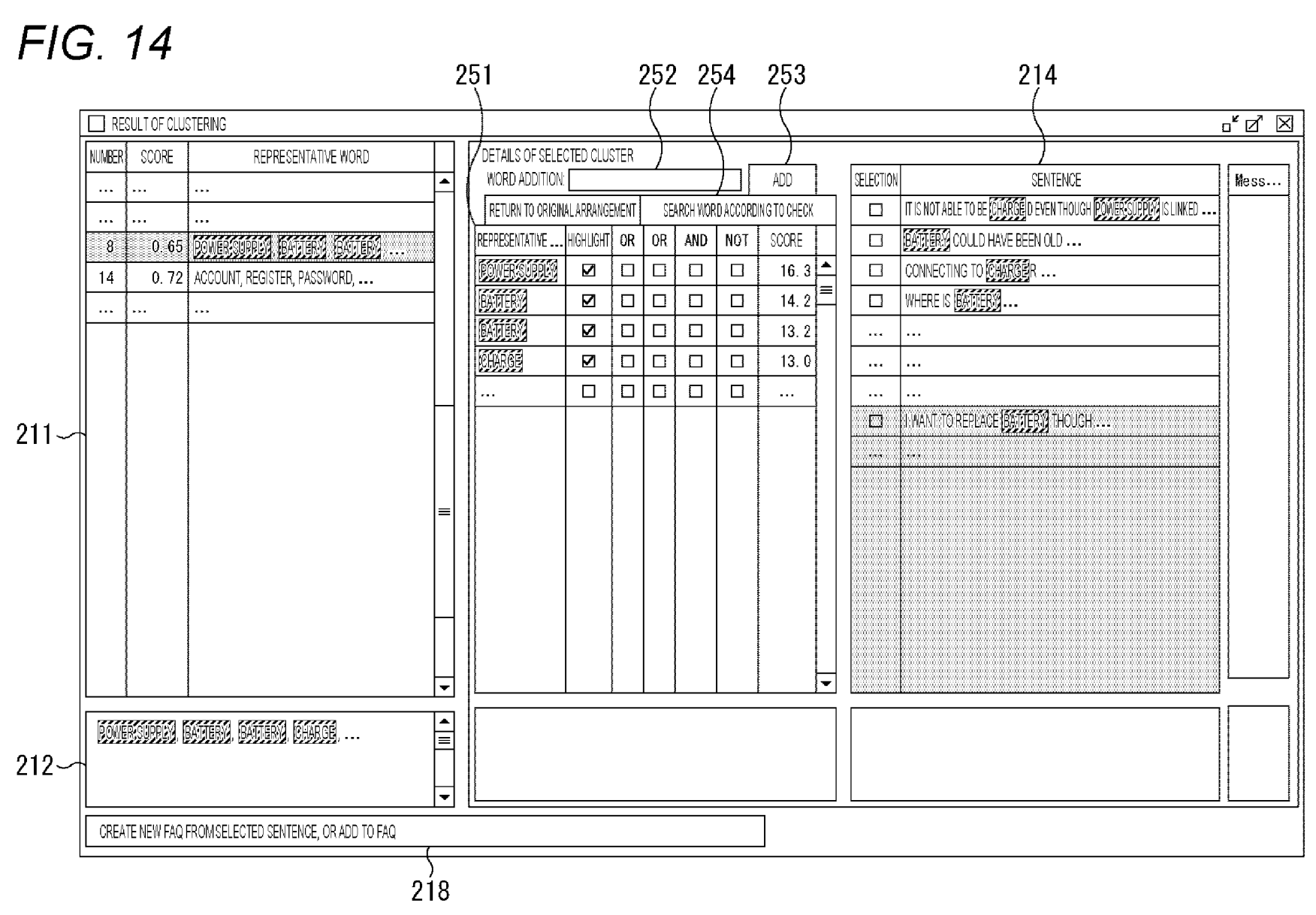

FIG. 14 is a diagram illustrating another example of the GUI related to the search keyword.

In the window of FIG. 14, a phrase display region 251, an input region 252, an addition button 253, and a synonym search button 254 are provided instead of the phrase display region 213, the input region 215, the reflection button 216, and the clear button 217 of the window of FIG. 8.

In the phrase display region 251, in addition to a check box and a score, a plurality of columns (two columns in the example of FIG. 14) of OR check boxes, one column of AND check boxes, and one column of NOT check boxes are displayed for each phrase. These check boxes are marked with only one check mark per phrase (in the row direction).

In a case where the OR check box in the same column is checked across a plurality of phrases, an OR search using the checked phrases is performed. Furthermore, in a case where the OR check box in a different column is checked across a plurality of phrases, an AND search using the checked phrase is performed.

For example, it is assumed that the OR check box in the first column of "word A", "word B", "word C", and "word D" is checked, and the OR check box in the second column of "word E", "word F", and "word G" is checked. In this case, a search such as {(word A) OR (word B) OR (word C) OR (word D)} AND {(word E) OR (word F) OR (word G)} is performed.

Furthermore, all phrases checked in the AND check box serve as conditions for an AND search, and all phrases checked in the NOT check box serve as conditions for a NOT search.

In the input region 252, phrase input by the operator OP is received. When the addition button 253 is operated in a state where a phrase is input to the input region 252, the phrase input to the input region 252 is added to the phrase display region 251.

Moreover, when the synonym search button 254 is operated, synonyms of phrases highlighted in the phrase display region 251 are presented in descending order of the similarity, for example.

Also with the above configuration, the operator OP can filter the sentence presented in the sentence selection region 214 with the phrase specified by the operator OP.

In the above description, the question sentences are clustered as the inquiry history.

The inquiry history includes a condition (tag) that can limit an answer range, such as an answer sentence corresponding to the question sentence, a contract state and a holding device at the time of inquiry, and a service being used. Therefore, not only the question sentence but also these answer sentences and conditions may be combined with the question sentence and clustered.

By the way, when creating a group of sentences, there may be a case in which the sentences is difficult to be sorted at a time up to the granularity of the intended final classification. In this case, for example, a cluster recursively generated is accepted by clustering of sentences included in a group of a plurality of sentences based on a predetermined phrase set by the operator OP.

Therefore, a large group is created by a higher-order concept, and a small group is recursively created from the group.

For example, in the window illustrated in FIG. 15, a classification display region 261 and a sentence selection region 262 are provided.

In the classification display region 261, the FAQ of "charge related" set by the operator OP among the FAQs created for a group of sentences selected in the sentence selection region 214 described above is displayed in a list form.

In the classification display region 261, the number of sentences included in the FAQ is displayed for each FAQ. The sentence (question sentence) included in the FAQ displayed in the classification display region 261 is displayed in the sentence selection region 262.

In this state, the sentences displayed in the sentence selection region 262 are clustered by a predetermined operation by the operator OP, so that the clustering result is displayed in the window illustrated in FIG. 16.

In the cluster display region 211 of FIG. 16, a plurality of clusters related to "charge related" is displayed. Furthermore, in the phrase display regions 212 and 213, representative phrases ("charger", "power supply", "connect", . . . ) included in a cluster of interest selected in the cluster display region 211 are displayed in descending order of importance. Then, in the sentence presented in the sentence selection region 214, the automatically suggested phrase ("charger", "power supply", "connect") is highlighted.

In this manner, by distributing the clusters recursively clustered among the plurality of operators OP, each operator OP can perform work in parallel, and the work time as a whole can be shortened.

Furthermore, in a case where the importance of a phrase according to tf-idf is calculated for a group of higher concepts, the phrase (for example, "charge related") that has created the group is included in almost all sentences, and thus the importance of the phrase is low. As a result, it is easy to create a small group based on other important phrases.

<4. Presentation of Information for Giving Classification to a Group of Sentences>

Figure 17:
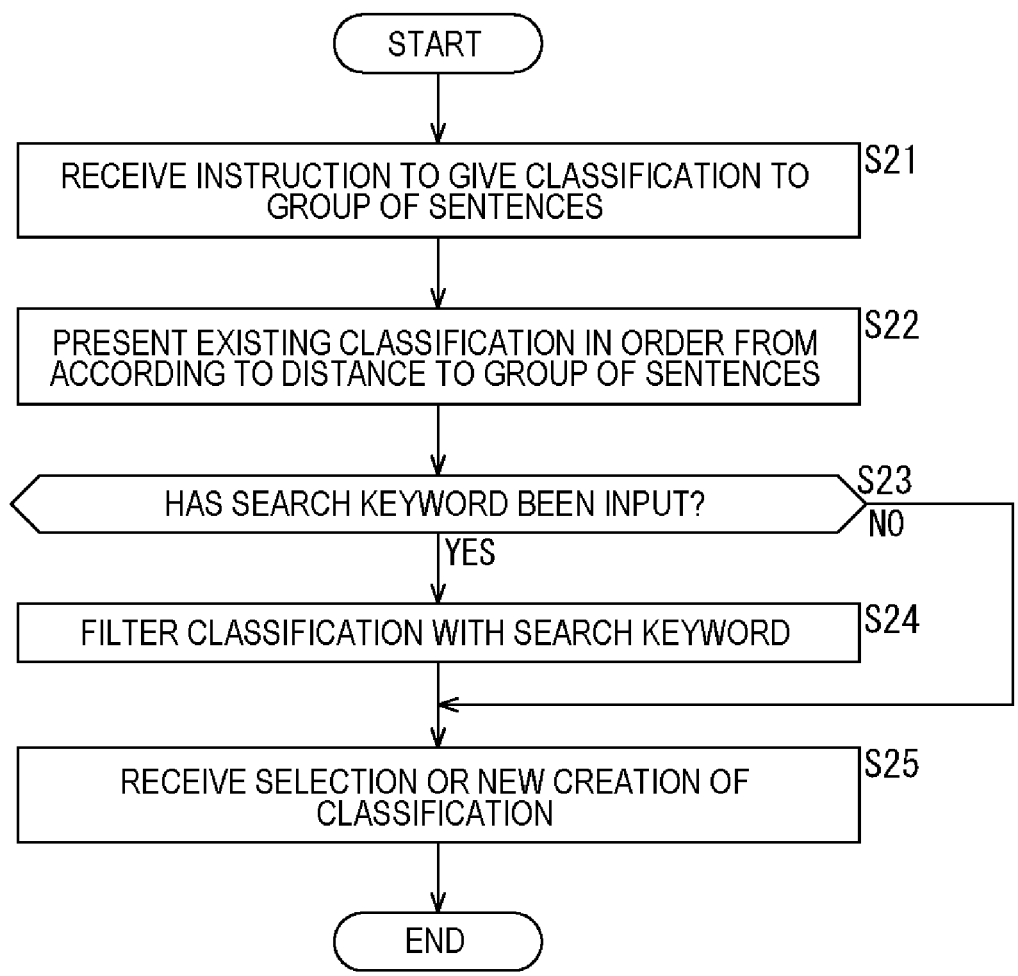
FIG. 17 is a flowchart for explaining of presenting information for giving classification to a group of sentences.

Next, processing in which the information processing terminal 110 presents information for giving a classification (FAQ) to a group of created sentences (a group of question sentences) will be described with reference to a flowchart in FIG. 17. The process of FIG. 17 is also executed by the FAQ construction/search support tool.

In Step S21, the reception unit 111$b$ receives an instruction to assign a classification to a group of sentences on the display screen displayed on the display unit 112.

In Step S22, the presentation unit 111$a$ presents the existing classifications in the classification presentation region on the display screen displayed on the display unit 112 in order according to the distance to the group of sentences.

Thereafter, in Step S23, the reception unit 111$b$ determines whether or not the search keyword (search phrase) designated by the operator OP has been input to the input region on the display screen displayed on the display unit 112.

In a case where the search keyword is input, the process proceeds to Step S24, and the presentation unit 111$a$ filters the classification presented in the classification presentation region with the input search keyword. Thereafter, the process proceeds to Step S25.

On the other hand, in a case where the search keyword has not been input, Step S24 is skipped.

In Step S25, the reception unit 111$b$ receives selection of a classification in the classification presentation region or receives new creation of a classification.

According to the above processing, the operator OP can easily determine which existing classification a group of sentences having the same intention applies to.

(Example of GUI)

Hereinafter, an example of the GUI on the display screen displayed on the display unit 112 in the processing of FIG. 17 described above will be described.

FIG. 18 is a diagram illustrating an example of a GUI. The window illustrated in FIG. 18 is displayed by operating the button 218 in FIG. 8.

In the window of FIG. 18, sentences constituting a group of sentences created in the processing of FIG. 7 described above are displayed in a list form in a sentence display region 311.

In the sentence display region 311, a score indicating the similarity between a check box and a sentence to which the check mark is attached is displayed for each sentence.

In the example of FIG. 18, the three sentences from the top to which the check mark is attached in the sentence display region 311 are sentences constituting a group of the created sentences, and the score is not displayed. On the other hand, the fourth and subsequent sentences from the top to which the check mark is not attached in the sentence display region 311 are sentences similar to the sentences constituting the group of the created sentences, and the above-described score is displayed.

In sentence detail display regions 312 and 313, details (full text) of the sentence (sentence with the background displayed in gray) selected in the sentence display region 311 are displayed. In particular, in the sentence detail display region 313, the editing of the sentence by the operator OP can be accepted.

An inquiry (question sentence) sent to a call center or the like may include words that are not related to solving a problem, such as information associated with information regarding a date and time or a user's personal opinion, or wording that is not common. Therefore, the operator OP can edit the sentence to be classified into a state applicable to the natural language processing by deleting such words from the sentence displayed in the sentence detail display region 313 or changing the words to general words.

In a classification presentation region 314, classifications in which existing sentences are grouped are presented in a list form in order from a group of created sentences (sentences to which a check mark is attached in the sentence display region 311). In the example of FIG. 18, a representative question sentence of FAQ is presented as a classification.

In the classification presentation region 314, a score indicating a distance between the classification and a group of sentences and the number of sentences included in the classification are displayed for each classification.

Therefore, the operator OP can quickly find a classification close to the group of the created sentence. Note that an item for newly creating a classification (FAQ) given to a group of sentences that does not have a score and the number of sentences is displayed at the top of the classification presentation region 314.

Moreover, in the window of FIG. 18, input regions 315-1 to 315-4 are presented as GUIs for accepting the input of the search keyword designated by the user. Hereinafter, in a case where the input regions 315-1 to 315-4 are not distinguished from each other, they are simply referred to as an input region 315.

When a reflection button 316 is operated in a state where the search keyword is input to any one of the input regions 315, the classification including the search keyword is searched from the classification presented in the classification presentation region 314 (the classification is filtered by the search keyword). In the classification presentation region 314, the classification after the search (after filtering) is presented. The classification search here is performed using an answer sentence or a question example included in the FAQ in addition to the representative question sentence of the FAQ.

In each of the input regions 315, similarly to the input region 215 described with reference to FIG. 8 and the like, an input of a plurality of search keywords is received.

In a case where a plurality of search keywords is input to one input region 315, OR search using the plurality of input search keywords is performed. Furthermore, in a case where the search keyword is input across the plurality of input regions 315, AND search using each input search keyword is performed.

Here, it is also assumed that a search with partial matching is performed for a plurality of classifications to be searched. Note that, although not illustrated, an input region for performing the NOT search may be separately provided.

Furthermore, for example, a right click operation with a mouse is performed on the input region 315 where the search keyword is not input, so that a candidate keyword as a candidate of the search keyword input to the input region 315 is presented.

Figure 19:
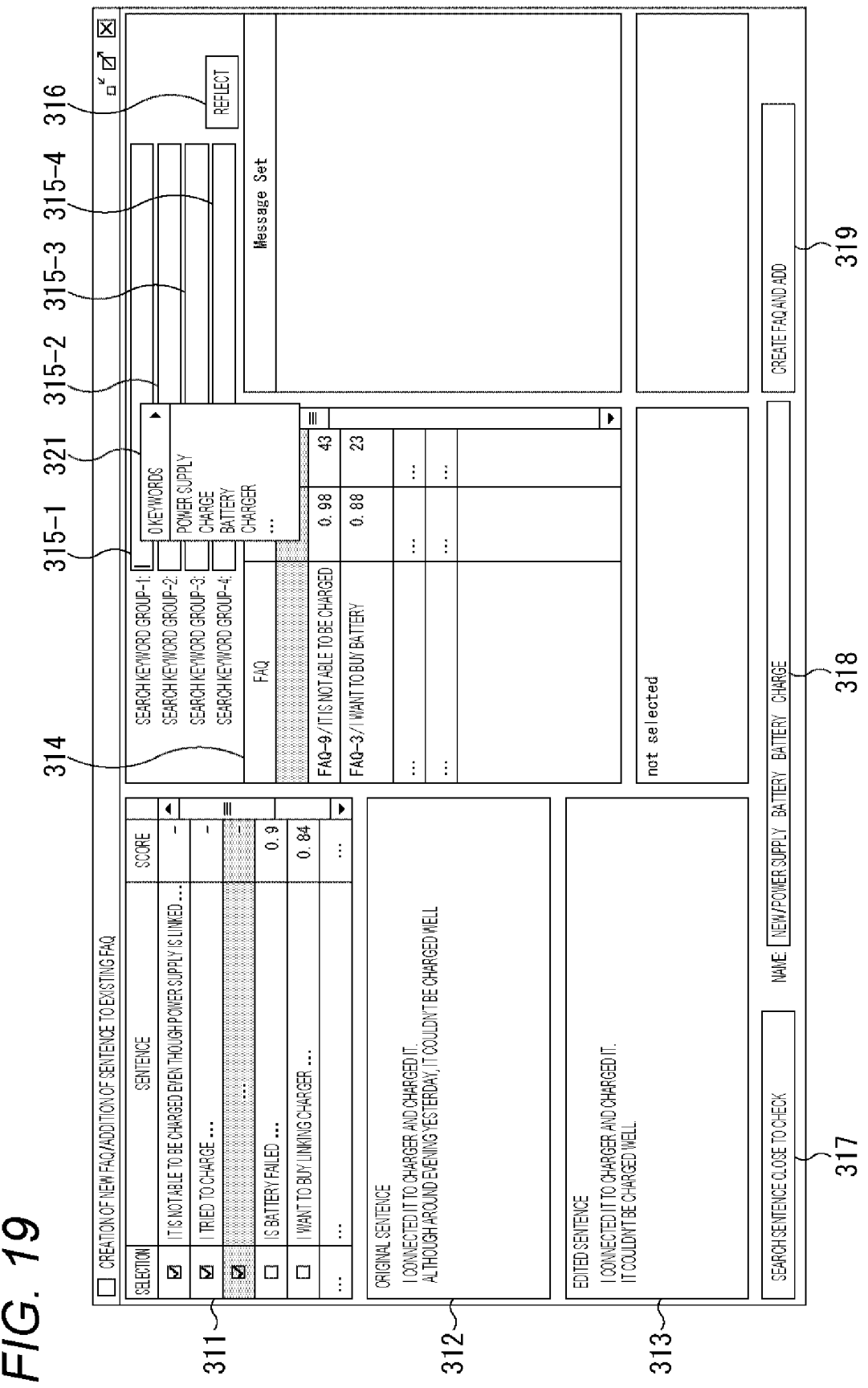
FIG. 19 is a diagram illustrating an example of a GUI.

For example, as illustrated in FIG. 19, when a right click operation is performed on the input region 315-1 in which the search keyword is not input, a candidate keyword menu 321 is displayed.

In the candidate keyword menu 321, phrases ("power supply", "charge", "battery", "charger", . . . ) included in a group of sentences (sentences with a check mark in the sentence display region 311) are presented as candidate keywords in descending order of importance. Note that the "0 keywords" shown at the top of the candidate keyword menu 321 will be described later.

The operator OP can input the search keyword to the input region 315 by selecting a phrase presented in the candidate keyword menu 321.

Moreover, for example, when a right click operation is performed on the input region 315 where the search keyword has already been input, a synonym (similar keyword) similar to the search keyword already input in the input region 315 is presented.

Figure 20:
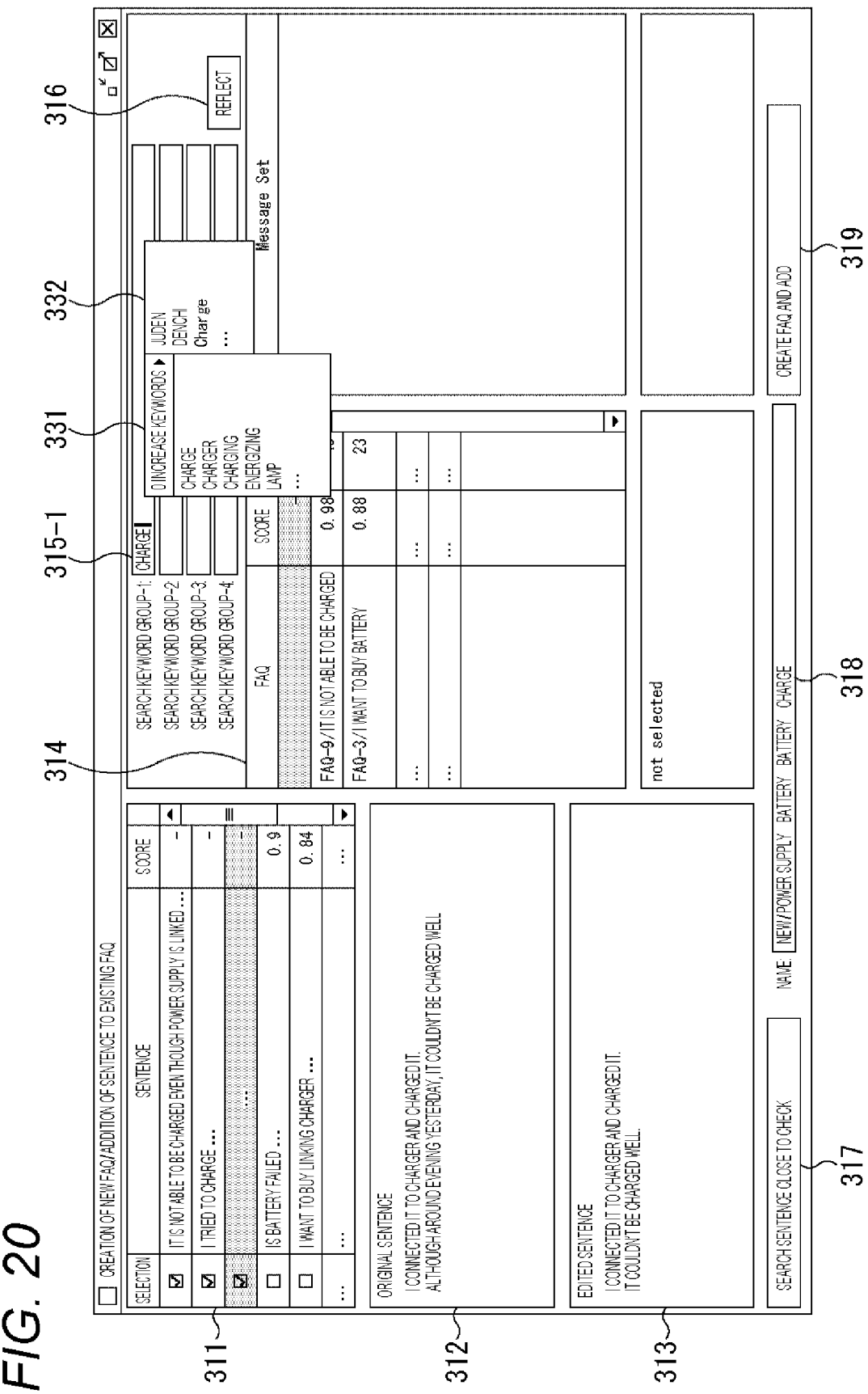
FIG. 20 is a diagram illustrating an example of a GUI.

For example, as illustrated in FIG. 20, when a right click operation is performed on input region 315-1 where the search keyword "charge" is input, a similar keyword menu 331 is displayed.

In the similar keyword menu 331, synonyms ("charge", "charger", "charging", "energizing", "lamp", . . . ) of "charge" already input in the input region 315-1 are presented as similar keywords in descending order of the similarity. Note that "0-increased keyword" shown at the top of the similar keyword menu 331 will be described later.

The operator OP can input a further search keyword to the input region 315 by selecting a phrase presented in the similar keyword menu 331.

Note that, in a case where a plurality of search keywords is input to the input region 315, similar keywords based on the similarity to the plurality of search keywords are presented.

Furthermore, the operator OP can also receive editing of the search keyword already input in the input region 315 or direct input of the search keyword into the input region 315. In particular, in the present embodiment, since the search is performed by partial matching, it is possible to increase the number of candidate classifications by editing the search keyword to be short.

Meanwhile, as illustrated in FIG. 20, in a case where the "0-increased keyword" in the similar keyword menu 331 is selected, a 0-increased keyword menu 332 is displayed to be distinguished from the similar keyword menu 331.

In the 0-increased keyword menu 332, among the similar keywords, the 0-increased keyword ("juden", "denchi", "Charge", . . . ), which is a similar keyword having no influence on the increase or decrease of the classification presented in the classification presentation region 314, is presented. That is, the 0-increased keyword is a phrase in which the number of classifications to be presented in the classification presentation region 314 does not increase even in a case where the 0-increased keyword is added to the input region 315 as the OR search condition.

Figure 21:
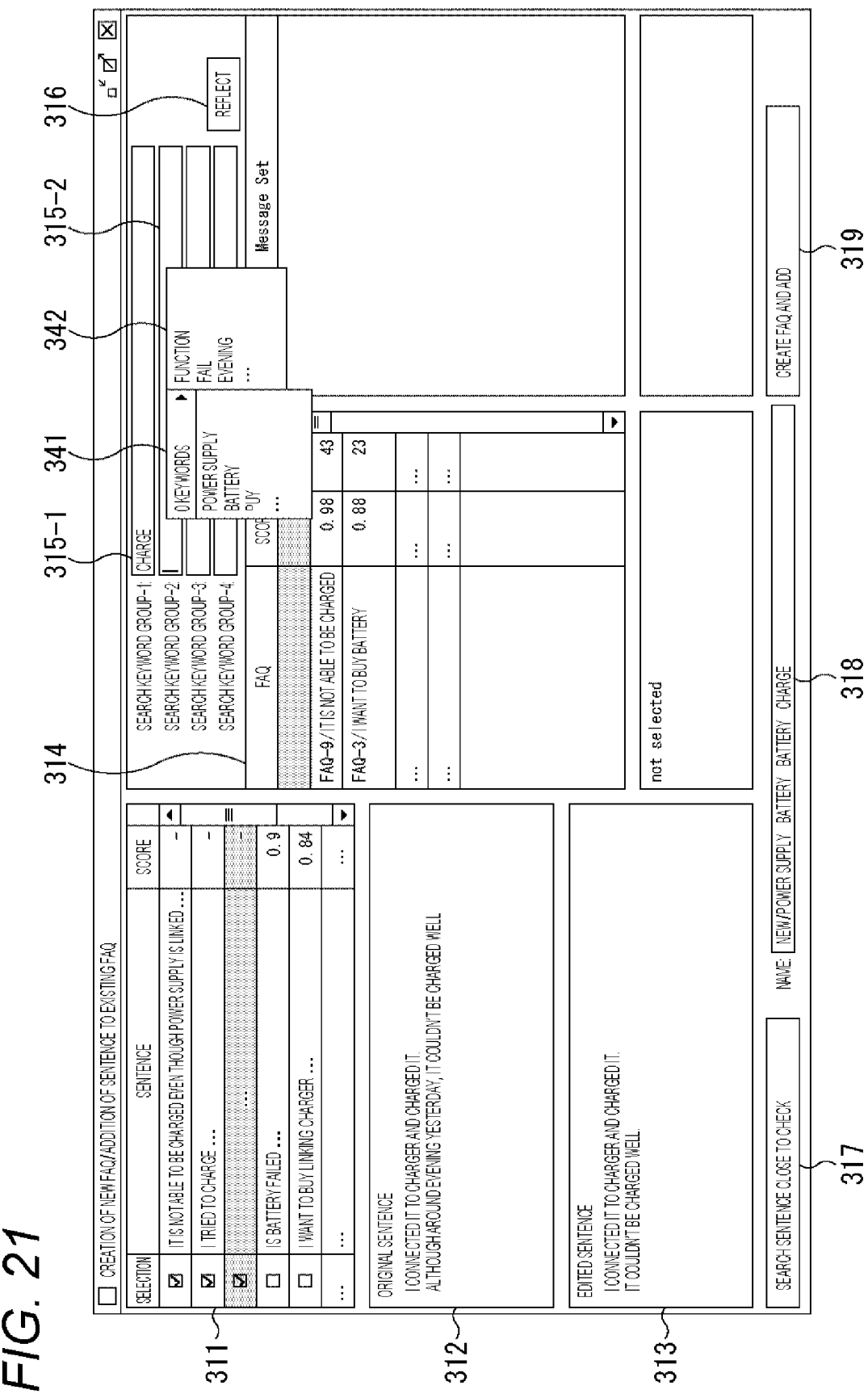
FIG. 21 is a diagram illustrating an example of a GUI.

Furthermore, in the example of FIG. 21, in a state where the search keyword "charge" is input in the input region 315-1, a right click operation is performed on the input region 315-2 where the search keyword is not input, whereby a candidate keyword menu 341 is displayed.

In a case where "0 keyword" in the candidate keyword menu 341 is selected in this state, a 0-keyword menu 342 is displayed to be distinguished from the candidate keyword menu 341.

In the 0 keyword menu 341, among the candidate keywords, the 0 keyword ("function", "FAIL", "evening", . . . ), which is a candidate keyword in which the sentence to be presented in the classification presentation region 314 becomes 0, is presented. That is, the 0 keyword is a phrase in which the number of sentences presented in the classification presentation region 314 is 0 in a case where the 0 keyword is added to the input region 315 as a condition of the AND search.

Furthermore, in the example of FIG. 21, "power supply", "battery", "purchase", . . . are presented as phrases of high importance in a group of sentences in the candidate keyword menu 341, but "charge" already input in the input region 315-1 is omitted in the candidate keyword menu 341.

As described above, the sentence presented in the classification presentation region 314 is filtered by the search keyword input to the input region 315. Note that, in the classification presented in the classification presentation region 314, the search keyword input to the input region 315 is highlighted.

Furthermore, in a case where a button 317 is operated in a state in which a check mark is newly added to a sentence to which no check mark is added in the sentence display region 311, the similarity is recalculated to search for a sentence similar to the sentence to which a check mark is newly added. The newly searched sentence is added to the sentence display region 311.

Therefore, the operator OP can collectively process the sentences having the same intention as the sentences constituting the group of the created sentences.

Note that, in a case where the similarity is recalculated, if the sentence has a feature amount close to that of the sentence to which the check mark is attached, the sentence already determined to be irrelevant in the sentence display region 311 may be displayed again in the sentence display region 311.

Therefore, although not illustrated, a check mark indicating a sentence once determined to be irrelevant may be assigned so as to be excluded from the recalculation of the similarity.

Furthermore, after the recalculation, in the sentence display region 311, the sentence may be highlighted to indicate that the sentence has been once determined to be irrelevant, or a color change or a graph according to the elapsed time from when the sentence has been highlighted may be presented. Therefore, the operator OP can grasp the sentence once determined to be irrelevant.

Note that, in the sentence display region 311, all of the sentences included in the sentence set can be displayed in addition to the sentences constituting the group of sentences. However, since the operator OP can check the sentence without limitation, it is preferable that the number of displayed sentences is limited for work efficiency.

Therefore, in the sentence display region 311, only the sentences filtered on the basis of the threshold of the similarity with the sentence to which the check mark is attached, the threshold of the number of times of display, both of these thresholds, and the like may be displayed, or the background other than these sentences may be displayed in gray. Therefore, this can reduce unnecessary work of the operator OP.

Furthermore, in the sentence display region 311, when the number of checked sentences increases, scrolling in the sentence display region 311 is required. Therefore, in the sentence display region 311, the region of the sentence to which the check mark is attached may be folded and hidden.

Meanwhile, in the window illustrated in FIG. 18 and the like, in a state where an item displayed at the top of the classification presentation region 314 is selected, new creation of a classification (classification) given to a group of sentences is received.

At this time, the operator OP inputs predetermined words in an input region 318, and operates a button 319 to newly create a classification of the name of the words input in the input region 318.

Note that, in the window illustrated in FIG. 8 and the like, the phrase displayed in the phrase display region 213 is likely to well express the intention of the sentence (question sentence) included in the group of created sentences. Similarly, there is a high possibility that the search keyword input to the input region 215 also well expresses the intention of the sentence included in the group of created sentences.

Therefore, as illustrated in FIG. 19 and the like, a phrase displayed in the phrase display region 213 or a search keyword input to the input region 215 may be displayed in the input region 318 as a candidate for a name of a newly created classification.

In the above description, it has been described that giving a classification to a group of sentences is searching an FAQ corresponding to a question sentence. Therefore, in addition to the question sentence, an e-mail or chat in customer support, a voice recognition result of phone reception, and a memo input to the information processing terminal 110 by the operator OP who is in the reception are set as a group of input sentences, whereby the FAQ retrieval can be supported.

Figure 22:
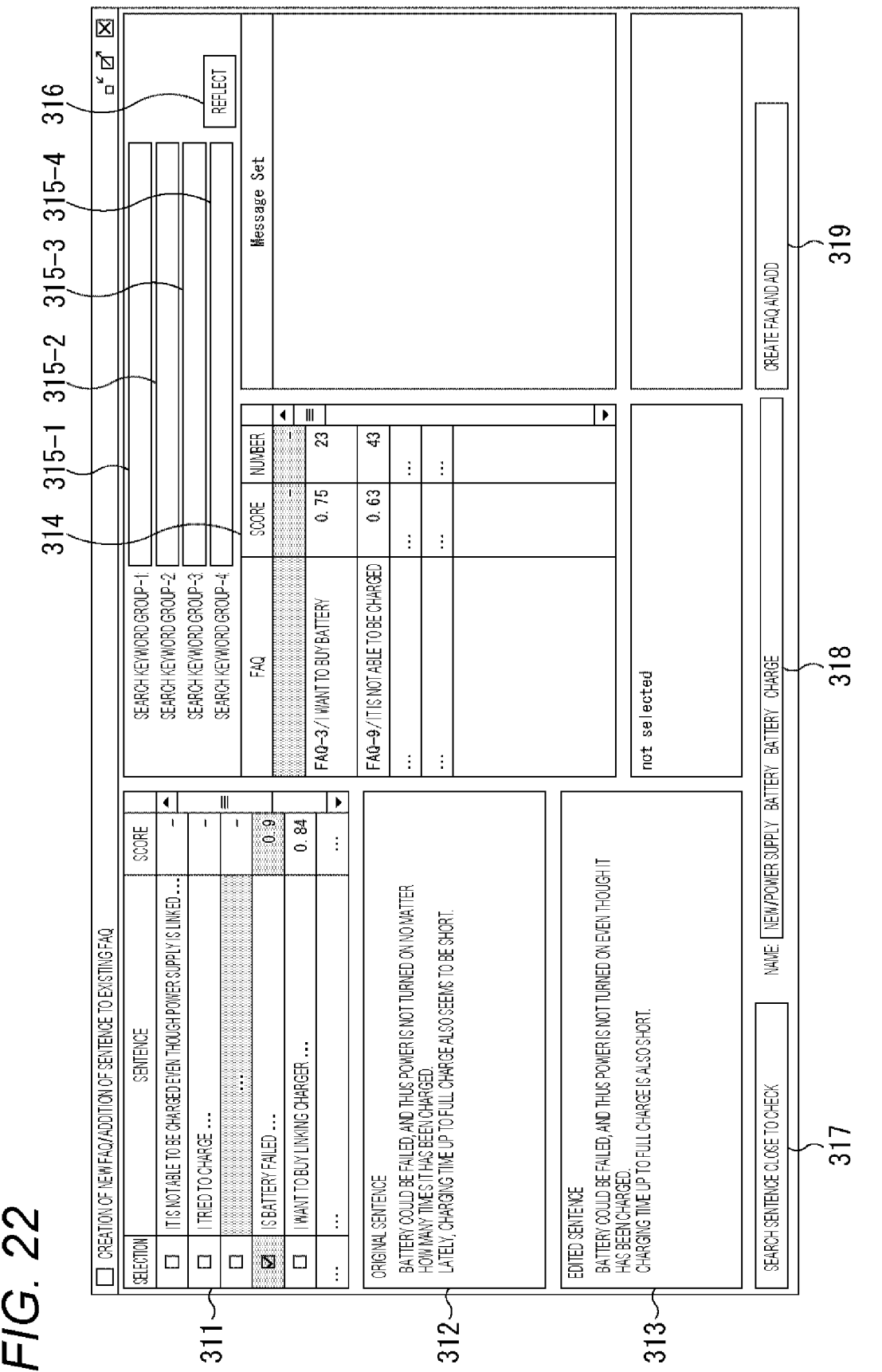
FIG. 22 is a diagram illustrating an example of a GUI.

Furthermore, in addition to inputting a group of sentences, there is a case where efficiency is better when a group of sentences is not created as a business procedure and sentences selected one by one from the original sentence set are input as illustrated in the sentence display region 311 of FIG. 22. In this case, the operator OP can selectively use the criterion for selecting the sentence according to the purpose.

For example, in a case where it is desired to quickly create a classification that is not in the existing classification (an FAQ that cannot be covered by the existing FAQ), it is possible to preferentially process a question far from the existing classification. Conversely, in a case where sentences close to the existing classification are preferentially processed, familiar questions that can be covered by the existing FAQ can be preferentially processed.

Furthermore, when the operator OP performs the work, it is considered that the work efficiency is enhanced by successively processing the questions having similar contents in order instead of randomly processing the questions having different contents. Therefore, the distance between all the sentences in the sentence set is calculated, and the sentences are presented in the ascending order of the total distance between the adjacent sentences. Therefore, the operator OP can sequentially process questions having similar contents, and work efficiency can be improved.

In the above-described embodiment, in a case where a classification (FAQ) corresponding to a group of sentences (question sentences) is newly created, it is necessary to create content (for example, an answer sentence) for the group of sentences.

Figure 23:
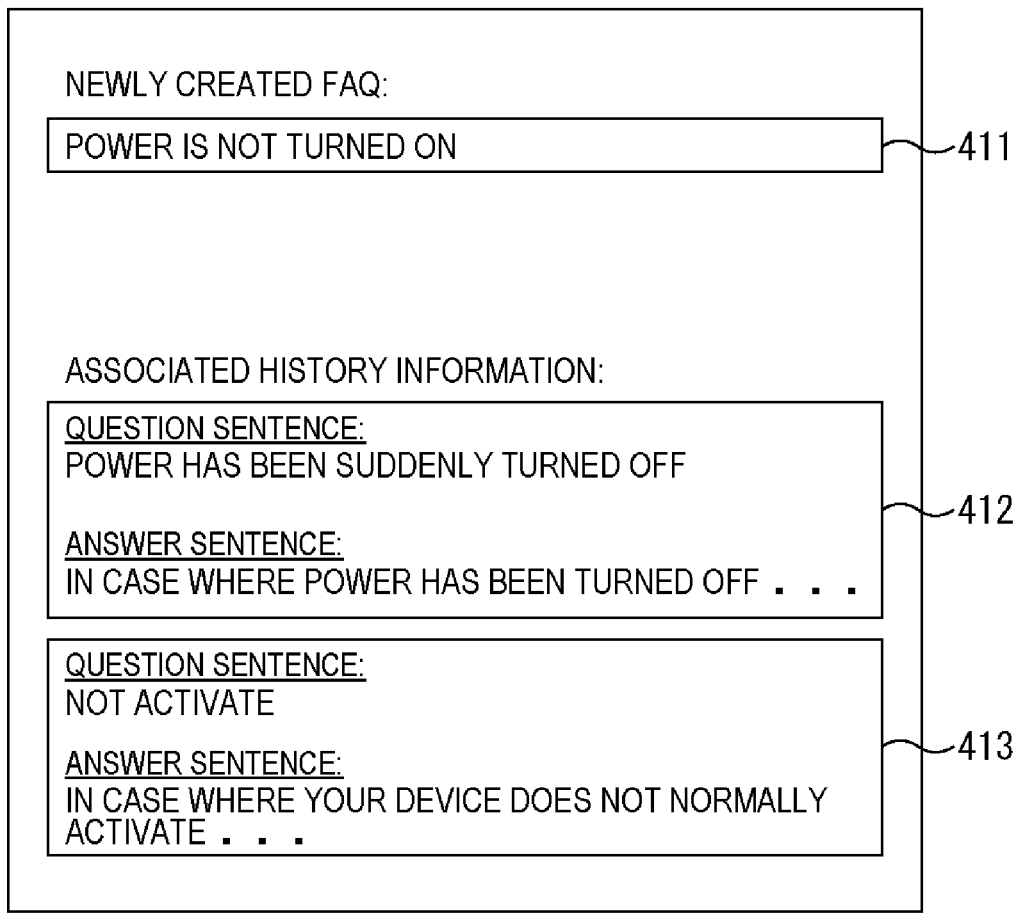
FIG. 23 is a diagram illustrating an example of a GUI.

At this time, as in the GUI illustrated in FIG. 23, an answer sentence responding to some question sentences serving as triggers for newly creating an FAQ is presented.

The GUI of FIG. 23 is provided with a display region 411 in which a newly created FAQ representative question sentence is displayed, and display regions 412 and 413 in which history information associated with the representative question sentence is displayed.

In the example of FIG. 23, a representative question sentence "Power is not turned on" is displayed in the display region 411. The display region 412 displays, as history information associated with the representative question sentence, a question sentence "The power has been suddenly turned off" and an answer sentence "In a case where the power has been turned off . . . " to the question sentence. Furthermore, in the display region 413, a question sentence of "Not activate" and an answer sentence of "In a case where your device does not normally activate . . . " to the question sentence are displayed as history information associated with the representative question sentence.

With such a GUI, the operator OP can more easily create an FAQ.

The window displayed in the above-described embodiment may be used by an end user instead of the operator OP who performs customer support. In this case, information such as age, sex, contract state, and holding device of the end user may be used as the meta-information not directly associated with the sentence or the classification.

Therefore, for example, in the phrase display region 213 of FIG. 8, it is possible to display a phrase that is difficult for the end user in a filtered manner or in a lower portion according to the age of the end user. Furthermore, in the classification presentation region 314 of FIG. 18, an FAQ not related to the end user can be filtered and displayed, or displayed in the lower part according to the contract state of the end user.

<5. Applications>

Hereinafter, applications of the above-described embodiments will be described.

Usually, the operator OP records the contents sequentially in a window 421 of a memo application as illustrated in FIG. 24 displayed on the screen of the PC in the phone reception so that the operator OP does not forget the contents of the interview or does not ask back the contents.

In the example of FIG. 24, memos "Kd-40f1", "Several times of lighting of power LED", "From yesterday", and "Several years or more since purchase" related to the model name and the state of the electronic device are recorded in the window 421.

Such a memo tends to be inaccurate because it is recorded while responding to a phone call, but it is considered that the memo includes a model name necessary for solving a problem and an important phrase in FAQ retrieval.

On the other hand, depending on the work of phone reception, information corresponding to characteristics of electronic devices and services may be held in advance so as to be easily referred to by the operator OP. For example, in the case of an electronic device, a manual for each model may be prepared.

Therefore, a dictionary of model names and product names, rules regarding similar phrases, and a machine learning model for ambiguous search may be prepared in correspondence with the memo application described above. Therefore, it is possible to present what attribute a phrase included in a memo is or present an appropriate candidate even if the phrase is incorrect information.

Figure 25:
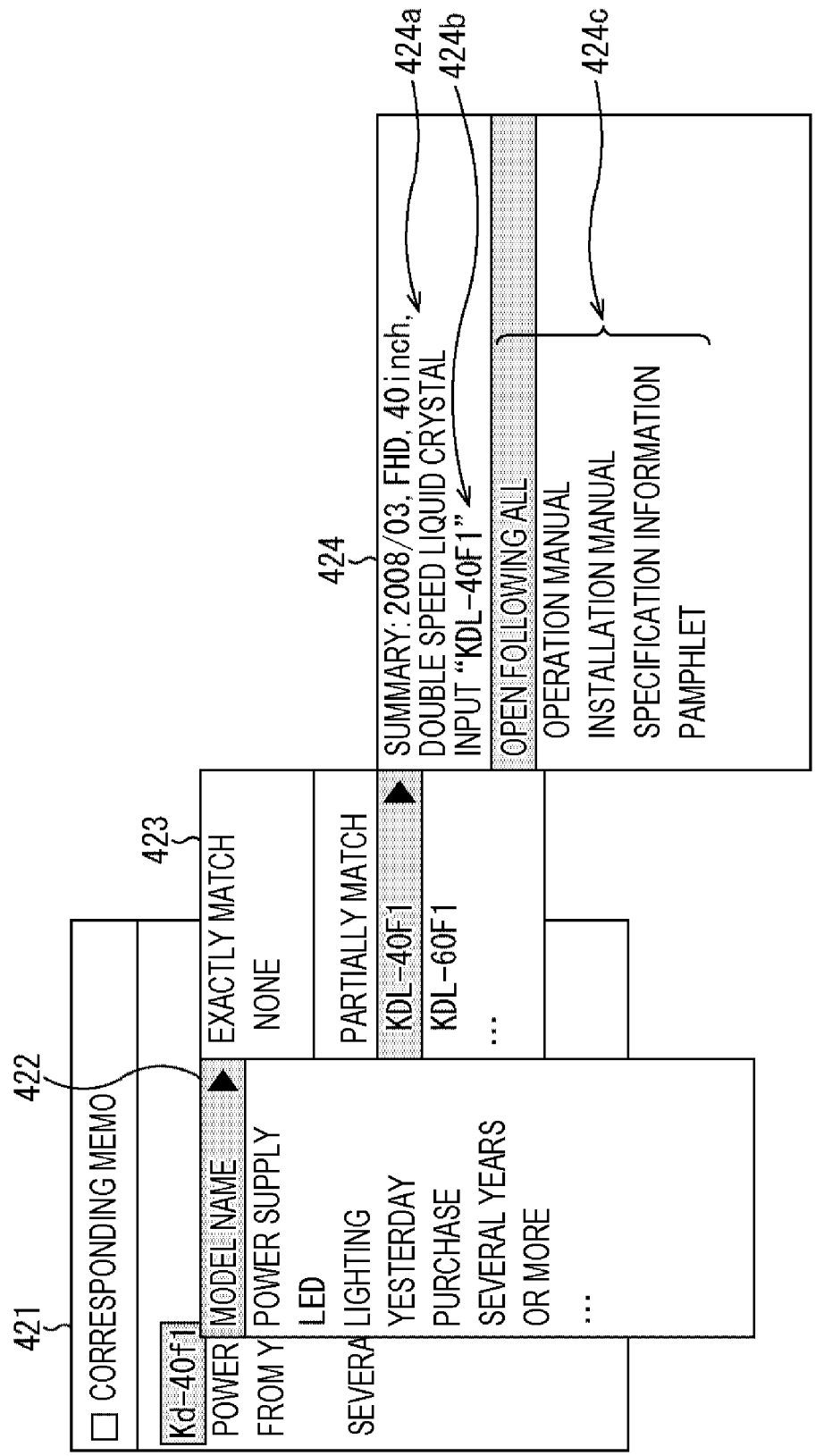
FIG. 25 is a diagram illustrating an example of a GUI.

For example, as illustrated in FIG. 25, in a case where "Kd-40f1" is designated in the window 421, it is presented in a menu 422 that "Kd-40f1" is the model name. Moreover, in a menu 423, the fact that there is no model name exactly matching the specified "Kd-40f1" and model names "KDL-40F1" and "KDL-40F1" partially matching by ambiguous search are presented.

Moreover, in the example of FIG. 25, when the model name "KDL-40F1" is selected in the menu 423, a menu 424 is displayed. In the menu 424, relevant information 424a related to the model name "KDL-40F1" and selection information 424b for selecting input of the model name "KDL-40F1" as the above-described automatically suggested phrase are presented. Moreover, in the menu 424, link information 424c for opening a manual or the like for the electronic device having the model name "KDL-40F1" is presented.

Furthermore, the automatically suggested phrase may be input to an arbitrary input region in another system in addition to the input region to which the search keyword is input in the information processing system 100 described above.

For example, a phrase selected by the operator OP from among presented automatically suggested phrases may be input to an input region for inputting a model number, an input region for inputting a memo of a reception content, or the like in a reception history recording system provided separately from the information processing system 100. Therefore, the operator OP can save labor of keyboard operation.

Moreover, in a case where an attribute (model number, reception contents, etc.) of an input region to which an automatically suggested phrase is input is known, the presented automatically suggested phrase may be filtered according to the attribute.

In the above description, the processing related to construction and search of the FAQ is performed on the information processing server 120, and only display of the GUI is performed on the information processing terminal 110. The present invention is not limited thereto, and processing related to construction and search of FAQ and display of GUI may be performed on the information processing terminal 110. Moreover, each process executed by the information processing system 100 described above is only required to be performed in either the information processing terminal 110 or the information processing server 120.

<6. Configuration Example of Computer>

A series of processes described above may be performed by hardware, or may be performed by software. In a case where the series of processing is executed by software, a program constituting the software is installed from a program recording medium to a computer incorporated in dedicated hardware, a general-purpose personal computer, or the like.

FIG. 26 is a block diagram illustrating a hardware configuration example of the computer which performs a series of processes described above by a program.

The information processing terminal 110 described above is realized by a computer 1000 having the configuration illustrated in FIG. 26.

A CPU 1001, a ROM 1002, and a RAM 1003 are connected to one another by a bus 1004.

An input/output interface 1005 is further connected to the bus 1004. An input unit 1006 including a keyboard, a mouse, and the like, and an output unit 1007 including a display, a speaker, and the like are connected to an input/output interface 1005. Furthermore, a storage unit 1008 including a hard disk, a nonvolatile memory, or the like, a communication unit 1009 including a network interface or the like, and a drive 1010 that drives a removable medium 1011 are connected to the input/output interface 1005.

In the computer 1000 configured as described above, for example, the CPU 1001 loads a program stored in the storage unit 1008 into the RAM 1003 via the input/output interface 1005 and the bus 1004 and executes the program, whereby the above-described series of processing is performed.

The program executed by the CPU 1001 is provided, for example, by being recorded in the removable medium 1011 or via a wired or wireless transmission medium such as a local area network, the Internet, or digital broadcasting, and is installed in the storage unit 1008.

Note that the program executed by the computer 1000 may be a program in which processing is performed in time series in the order described in the present specification, or may be a program in which processing is performed in parallel or at necessary timing such as when a call is made.

Note that embodiments of the present technology are not limited to the above-described embodiments, and various changes can be made in a scope not departing from the spirit of the present technology.

Furthermore, the effects described in the present specification are merely examples and are not limited, and other effects may be provided.

Moreover, the present disclosure can have the following configurations.

(1)

An information processing apparatus including:
a presentation unit configured to present a sentence included in a cluster of interest among clusters generated by clustering a sentence set in a sentence selection region; and a reception unit configured to receive selection of the sentence constituting a group of sentences from the sentences presented in the sentence selection region.

(2)

The information processing apparatus according to (1), in which the presentation unit presents the sentence not included in the cluster of interest together with the sentence included in the cluster of interest in the sentence selection region in order based on the cluster of interest.

(3)

The information processing apparatus according to (2), in which the presentation unit presents the sentence not included in the cluster of interest in a mode different from the sentence included in the cluster of interest in the sentence selection region.

(4)

The information processing apparatus according to (3), in which the presentation unit highlights a predetermined number of the phrases of high importance in the sentence presented in the sentence selection region.

(5)

The information processing apparatus according to any one of (1) to (4), in which the reception unit receives a search of the sentence including a search phrase designated by a user from the sentence presented in the sentence selection region, and the presentation unit presents the searched sentence in the sentence selection region.

(6)

The information processing apparatus according to (5), in which the presentation unit presents an input region that receives an input of the search phrase.

(7)

The information processing apparatus according to (6), in which the presentation unit presents, together with the input region, a candidate phrase that is a candidate for the search phrase input to the input region.

(8)

The information processing apparatus according to (7), in which the reception unit receives an OR search using a plurality of the search phrases input to one of the input regions and an AND search using the search phrases input across a plurality of the input regions.

(9)

The information processing apparatus according to (7), in which the presentation unit presents a phrase included in the cluster of interest as the candidate phrase in order based on importance.

(10)

The information processing apparatus according to (7), in which the presentation unit presents, as the candidate phrase, a synonym of the search phrase already input in the input region in order based on similarity to the search phrase.

(11)

The information processing apparatus according to (7) or (10), in which the presentation unit presents the candidate phrase having no influence on an increase or decrease of the sentence presented in the sentence selection region among the candidate phrases while distinguishing the candidate phrase from other candidate phrases.

(12)

The information processing apparatus according to (7) or (9), in which the presentation unit presents the candidate phrase in which the sentence to be presented in the sentence selection region is 0 among the candidate phrases while distinguishing the candidate phrase from other candidate phrases.

(13)

The information processing apparatus according to (6), in which the presentation unit highlights the search phrase input to the input region in the sentence presented in the sentence selection region.

(14)

The information processing apparatus according to (6), in which the presentation unit accepts editing of the search phrase already input in the input region.

(15)

The information processing apparatus according to (1), in which the reception unit accepts a cluster recursively generated by clustering of the sentences included in a group of a plurality of the sentences based on a predetermined phrase set by a user.

(16)

The information processing apparatus according to (1), in which the presentation unit presents a classification in which the existing sentences are grouped, in the classification presentation region, in order based on a distance to a group of the sentences designated by a user.

(17)

The information processing apparatus according to (16), in which the reception unit receives a search of the classification including a search phrase designated by the user from the classification presented in the classification presentation region, and the presentation unit presents the searched classification in the classification presentation region.

(18)

The information processing apparatus according to (17), in which the presentation unit presents an input region that receives an input of the search phrase.

(19)

The information processing apparatus according to (18), in which the presentation unit presents, together with the input region, a candidate phrase that is a candidate for the search phrase input to the input region.

(20)

The information processing apparatus according to (19), in which the presentation unit presents a phrase included in a group of the sentences as the candidate phrases in order based on importance.

(21)

The information processing apparatus according to (19), in which the presentation unit presents, as the candidate phrase, a synonym of the search phrase already input in the input region in order based on similarity to the search phrase.

(22)

The information processing apparatus according to (19) or (21), in which the presentation unit presents the candidate phrase having no influence on an increase or decrease of the classification presented in the classification presentation region among the candidate phrases while distinguishing the candidate phrase from other candidate phrases.

(23)

The information processing apparatus according to (19) or (20), in which the presentation unit presents the candidate phrase of which the classification presented in the classification presentation region is 0 among the candidate phrases while distinguishing the candidate phrase from other candidate phrases.

(24)

The information processing apparatus according to (18), in which the presentation unit highlights the search phrase input to the input region among phrases included in the classification presented in the classification presentation region.

(25)

The information processing apparatus according to (18), in which the presentation unit accepts editing by the user of the search phrase already input in the input region.

(26)

The information processing apparatus according to (16), in which the presentation unit presents a similar sentence similar to a group of the sentences, and the reception unit receives an addition of the similar sentence to a group of the sentences.

(27)

The information processing apparatus according to (26), in which the presentation unit further presents a similar sentence similar to the similar sentence added to a group of the sentences.

(28)

The information processing apparatus according to (26) or (27), in which the presentation unit limits the number of similar sentences to be presented on the basis of a predetermined threshold value.

(29)

The information processing apparatus according to (17), in which the reception unit receives new creation of the classification for grouping the sentences included in a group of the sentences.

(30)

The information processing apparatus according to (27), in which the presentation unit presents the search phrase as a candidate for a name of the classification to be newly created.

(31)

The information processing apparatus according to (16), in which the reception unit receives an input of at least one of a group of the sentences and the sentences selected one by one from the sentence set as a target to which the classification is given.

(32)

An information processing method that is executed by an information processing apparatus, including: presenting a sentence included in a cluster of interest among clusters generated by clustering a sentence set in a sentence selection region; and receiving selection of the sentence constituting a group of sentences from the sentences presented in the sentence selection region.

(33)

A program for causing a computer to execute: presenting a sentence included in a cluster of interest among clusters generated by clustering a sentence set in a sentence selection region; and receiving selection of the sentence constituting a group of sentences from the sentences presented in the sentence selection region.

(34)

An information processing apparatus including: a presentation unit configured to present classifications into which existing sentences are grouped in a classification presentation region in order based on a distance to the predetermined sentences.

REFERENCE SIGNS LIST

100 Information processing system
110 Information processing terminal
120 Information processing server
111 Control unit
111a presentation unit
111b Reception unit
112 Display unit
113 Input unit
114 Communication unit
115 Storage unit
121 Control unit
122 Communication unit
123 Storage unit
1000 Computer

The invention claimed is:

1. An information processing apparatus, comprising:
circuitry configured to:
receive a first user input;
select, based on the first user input, a cluster of interest among clusters generated by a first clustering operation of a plurality of sentences;
control, based on the selection of the cluster of interest, a display screen to display a set of sentences of the plurality of sentences in a sentence selection region of the display screen;
receive a second user input on the display screen;
select, based on the second user input, at least one sentence from the set of sentences displayed in the sentence selection region;
receive a third user input on the display screen;
edit the selected at least one sentence based on the third user input; and
control the display screen to display, in a classification presentation region of the display screen, a classification corresponding to the edited at least one sentence.

2. The information processing apparatus according to claim 1, wherein
the circuitry is further configured to control the display screen to display a first sentence not included in the cluster of interest together with a second sentence included in the cluster of interest in the sentence selection region in an order, and the order is based on the cluster of interest.

3. The information processing apparatus according to claim 2, wherein the circuitry is further configured to control the display screen to display, in the sentence selection region, the first sentence not included in the cluster of interest in a mode different from the second sentence included in the cluster of interest.

4. The information processing apparatus according to claim 1, wherein the circuitry is further configured to:
receive a search of the at least one sentence including a search phrase designated by a user; and
control the display screen to display the searched at least one sentence in the sentence selection region.

5. The information processing apparatus according to claim 4, wherein the circuitry is further configured to control the display screen to display an input region that receives an input of the search phrase.

6. The information processing apparatus according to claim 5, wherein the circuitry is further configured to control the display screen to display, together with the input region, a candidate phrase that is a candidate for the search phrase input to the input region.

7. The information processing apparatus according to claim 6, wherein the circuitry is further configured to control the display screen to display a phrase included in the cluster of interest as the candidate phrase in order of importance.

8. The information processing apparatus according to claim 6, wherein
the circuitry is further configured to control the display screen to display, as the candidate phrase, synonyms of the search phrase input to the input region in an order, and
the order is based on a similarity of the synonyms to the search phrase.

9. The information processing apparatus according to claim 6, wherein the circuitry is further configured to control the display screen to display the candidate phrase of a plurality of candidate phrases having no influence on an increase or a decrease of the set of sentences displayed in the sentence selection region, while distinguishing the candidate phrase from remaining candidate phrases of the plurality of candidate phrases.

10. The information processing apparatus according to claim 6, wherein the circuitry is further configured to control the display screen to display the candidate phrase of a plurality of candidate phrases in which a number of sentences to be presented in the sentence selection region is 0, while distinguishing the candidate phrase from remaining candidate phrases of the plurality of candidate phrases.

11. The information processing apparatus according to claim 1, wherein
the circuitry is further configured to accept a cluster recursively generated by a second clustering operation of the set of sentences included in the plurality of sentences, and
the second clustering operation is based on a specific phrase set by a user.

12. The information processing apparatus according to claim 1, wherein
the circuitry is further configured to control the display screen to display a plurality of classifications corresponding to the set of sentences in an order,
the plurality of classifications includes the classification, and
the order is based on a distance of each classification of the plurality of classifications to a group of sentences of the plurality of sentences designated by a user.

13. The information processing apparatus according to claim 12, wherein the circuitry is further configured to:
receive a search of the classification including a search phrase designated by the user from the classification displayed in the classification presentation region; and
control the display screen to display the searched classification in the classification presentation region.

14. The information processing apparatus according to claim 13, wherein the circuitry is further configured to control the display screen to display an input region that receives an input of the search phrase.

15. The information processing apparatus according to claim 14, wherein the circuitry is further configured to control the display screen to display, together with the input region, a candidate phrase that is a candidate for the search phrase input to the input region.

16. The information processing apparatus according to claim 15, wherein the circuitry is further configured to control the display screen to display a phrase included in the group of sentences as the candidate phrase in order of importance.

17. The information processing apparatus according to claim 15, wherein
the circuitry is further configured to control the display screen to display, as the candidate phrase, synonyms of the search phrase input to the input region in an order, and
the order is based on a similarity of the synonyms to the search phrase.

18. The information processing apparatus according to claim 15, wherein the circuitry is further configured to control the display screen to display present the candidate phrase of a plurality of candidate phrases having no influence on an increase or a decrease of the classification displayed in the classification presentation region, while distinguishing the candidate phrase from remaining candidate phrases of the plurality of candidate phrases.

19. The information processing apparatus according to claim 15, wherein the circuitry is further configured to control the display screen to display the candidate phrase of a plurality of candidate phrases of which the classification displayed in the classification presentation region is 0, while distinguishing the candidate phrase from remaining candidate phrases of the plurality of candidate phrases.

20. The information processing apparatus according to claim 12, wherein the circuitry is further configured to:
control the display screen to display a similar sentence similar to the group of sentences; and
receive an addition of the similar sentence to the group of sentences.

21. The information processing apparatus according to claim 13, wherein the circuitry is further configured to receive new creation of the classification to group sentences included in the group of sentences.

22. The information processing apparatus according to claim 21, wherein the circuitry is further configured to control the display screen to display the search phrase as a candidate for a name of the classification to be newly created.

23. An information processing method executed by an information processing apparatus, the information processing method comprising:
- receiving a first user input;
- selecting, based on the first user input, a cluster of interest among clusters generated by clustering a plurality of sentences;
- controlling, based on the selection of the cluster of interest, a display screen to display a set of sentences of the plurality of sentences in a sentence selection region of the display screen;
- receiving a second user input on the display screen;
- selecting, based on the second user input, at least one sentence from the set of sentences displayed in the sentence selection region;
- receiving a third user input on the display screen;
- editing the selected at least one sentence based on the third user input; and
- controlling the display screen to display, in a classification presentation region of the display screen, a classification corresponding to the edited at least one sentence.

24. A non-transitory computer-readable medium having stored thereon, computer-executable instructions which, when executed by a computer, cause the computer to execute operations, the operations comprising:
- receiving a first user input;
- selecting, based on the first user input, a cluster of interest among clusters generated by clustering a plurality of sentences;
- controlling, based on the selection of the cluster of interest, a display screen to display a set of sentences of the plurality of sentences in a sentence selection region of the display screen;
- receiving a second user input on the display screen;
- selecting, based on the second user input, at least one sentence from the set of sentences displayed in the sentence selection region;
- receiving a third user input on the display screen;
- editing the selected at least one sentence based on the third user input; and
- controlling the display screen to display, in a classification presentation region of the display screen, a classification corresponding to the edited at least one sentence.

* * * * *